United States Patent
Abdoli et al.

(10) Patent No.: US 10,952,215 B2
(45) Date of Patent: Mar. 16, 2021

(54) METHOD AND SYSTEM FOR TRANSMISSION OVER MULTIPLE CARRIERS

(71) Applicant: Huawei Technologies Co., Ltd., Shenzhen (CN)

(72) Inventors: Javad Abdoli, Kanata (CA); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/407,406

(22) Filed: May 9, 2019

(65) Prior Publication Data

US 2020/0022143 A1 Jan. 16, 2020

Related U.S. Application Data

(60) Provisional application No. 62/696,127, filed on Jul. 10, 2018.

(51) Int. Cl.
*H04W 72/04* (2009.01)
*H04L 1/18* (2006.01)

(52) U.S. Cl.
CPC ....... *H04W 72/0453* (2013.01); *H04L 1/1861* (2013.01); *H04W 72/048* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2010/0120359 A1* | 5/2010 | Agarwal | ............ | H04B 7/18539 455/12.1 |
| 2012/0051306 A1* | 3/2012 | Chung | ....................... | H04L 5/14 370/329 |
| 2012/0082145 A1 | 4/2012 | Chen et al. | | |
| 2012/0188958 A1* | 7/2012 | Suzuki | .............. | H04W 72/0413 370/329 |

(Continued)

FOREIGN PATENT DOCUMENTS

| | | |
|---|---|---|
| CN | 101801094 A | 8/2010 |
| CN | 108260208 A | 7/2018 |

OTHER PUBLICATIONS

NTT Docomo, Inc., "Transport Block Mapping for Wider Bandwidth in LTE-Advanced", 3GPP TSG RAN WG1 Meeting #55, R1-084245, Nov. 10-14, 2008, 7 Pages, Prague, Czech Republic.

(Continued)

*Primary Examiner* — Otis L Thompson, Jr.
(74) *Attorney, Agent, or Firm* — Slater Matsil, LLP

(57) ABSTRACT

Methods and systems are provided that support the transmission of transport blocks over carrier bundles and bandwidth part (BWP) bundles. These carrier bundles and BWP bundles include physical resources from multiple carriers, the multiple carriers being a proper subset of the carriers configured for a user equipment (UE). A base station transmits an indication to the UE identifying one or more carrier bundles and/or BWP bundles. Each carrier bundle and BWP bundle supports the transmission of a respective transport block over a given duration, and is associated with a respective hybrid automatic repeat request (HARQ) entity.

26 Claims, 18 Drawing Sheets

| | One TB per configured carrier (e.g., FIG. 4A) | One TB for each configured carrier (e.g., FIG. 4B) | Carrier/BWP bundling (e.g., FIG. 5A) |
|---|---|---|---|
| Link adaptation | Better (Multiple ranks, PMI and MCS) | Worse (One rank, PMI and MCS) | Medium |
| Diversity and coding gain | Low | High | High |
| HARQ efficiency | High (Per carrier HARQ entity) | Unacceptable (Only one HARQ entity) | High (Per bundle HARQ entity) |
| HARQ Soft buffer | Non-sharing | Sharing | Flexible (Dependent on the number of bundles) |
| CSI Feedback | Per carrier CSI | Joint CSI | Joint CSI |
| DCI overhead | High | Low (Reduces number of blind decodings) | Flexible (Depends on number of bundles) |

(56) References Cited

U.S. PATENT DOCUMENTS

| | | | |
|---|---|---|---|
| 2012/0287869 A1* | 11/2012 | Xi | H04L 5/0098 |
| | | | 370/329 |
| 2019/0036673 A1* | 1/2019 | Chen | H04L 1/1657 |
| 2019/0103954 A1* | 4/2019 | Lee | H04W 76/28 |
| 2019/0261331 A1* | 8/2019 | Guthmann | H04L 5/0094 |
| 2019/0313391 A1* | 10/2019 | Lin | H04W 76/11 |
| 2019/0319752 A1 | 10/2019 | Tang et al. | |
| 2019/0349060 A1* | 11/2019 | Liao | H04L 5/005 |
| 2019/0357238 A1* | 11/2019 | Zhou | H04W 72/042 |
| 2020/0007292 A1* | 1/2020 | Huang | H04B 7/0695 |
| 2020/0008076 A1* | 1/2020 | Peng | H04W 72/12 |
| 2020/0008152 A1* | 1/2020 | Stauffer | H04W 52/0274 |
| 2020/0021407 A1* | 1/2020 | Abdoli | H04L 5/0098 |
| 2020/0137823 A1* | 4/2020 | Nam | H04W 52/0229 |
| 2020/0195386 A1* | 6/2020 | Marinier | H04L 1/1845 |

OTHER PUBLICATIONS

3rd Generation Partnership Project;Technical Specification Group Radio Access Network; NR;Medium Access Control (MAC) protocol specification (Release 15), 3GPP TS 38.321, V15.6.0, Jun. 2019, 77 Pages.

Nokia et al., "Transport block mapping and DL control signalling in LTE-Advanced", 3GPP TSG-RAN WG1 Meeting 155, R1-084315, Nov. 10-14, 2008, 5 Pages, Prague, Czech Republic.

Panasonic, "MAC to physical later mapping and control signaling for carrier aggregation", 3GPP TSG RAN WG1 Meeting #55, R1-084222, Nov. 10-14, 2008, 4 Pages, Prague, Czech Republic.

Intel Corporation, "On VRB to PRB interleaving", 3GPP TSG RAN WG1 Meeting #82, R1-1802390, Feb. 26, 2018 to Mar. 2, 2018, 4 Pages. Athens, Greece.

\* cited by examiner

|  | One TB per configured carrier (e.g., FIG. 4A) | One TB for each configured carrier (e.g., FIG. 4B) | Carrier/BWP bundling (e.g., FIG. 5A) |
| --- | --- | --- | --- |
| Link adaptation | Better (Multiple ranks, PMI and MCS) | Worse (One rank, PMI and MCS) | Medium |
| Diversity and coding gain | Low | High | High |
| HARQ efficiency | High (Per carrier HARQ entity) | Unacceptable (Only one HARQ entity) | High (Per bundle HARQ entity) |
| HARQ Soft buffer | Non-sharing | Sharing | Flexible (Dependent on the number of bundles) |
| CSI Feedback | Per carrier CSI | Joint CSI | Joint CSI |
| DCI overhead | High | Low (Reduces number of blind decodings) | Flexible (Depends on number of bundles) |

FIG. 5B

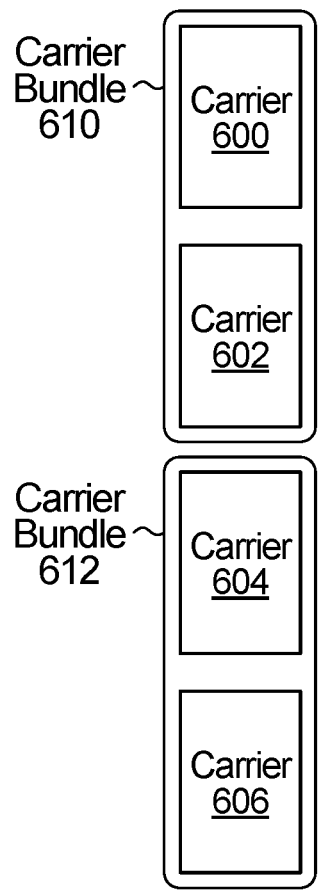
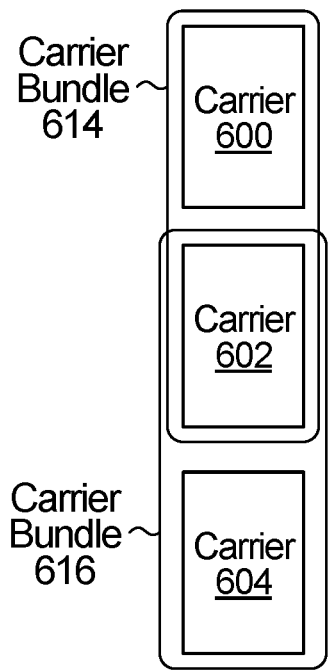
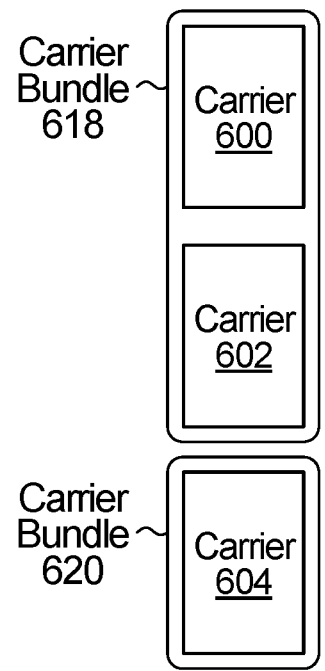
FIG. 6A
FIG. 6B
FIG. 6C

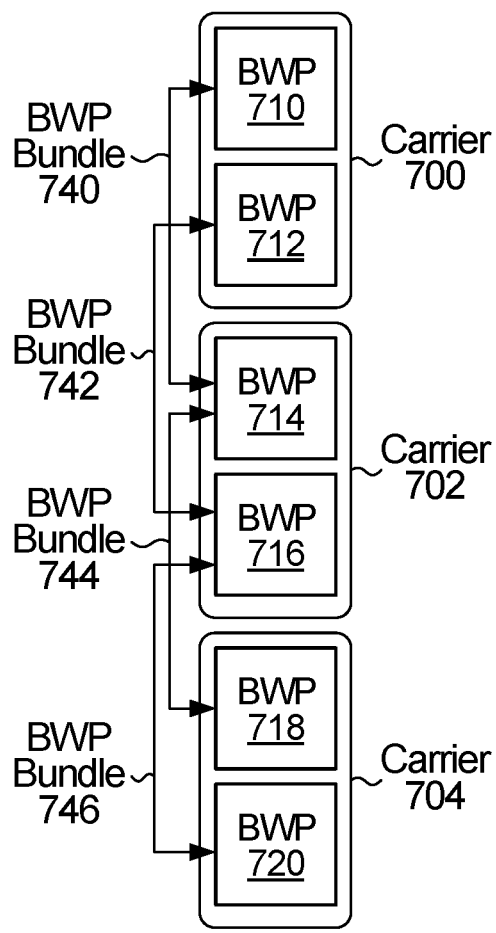 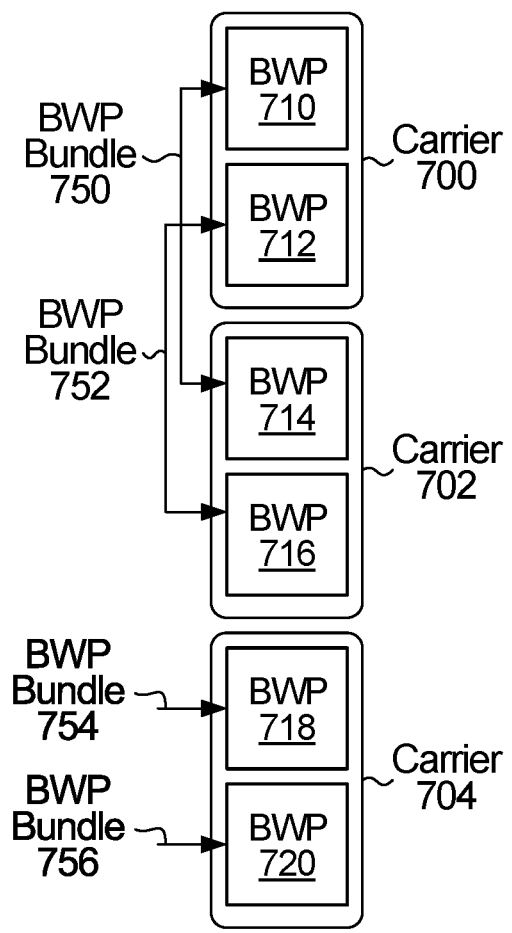
FIG. 7B  FIG. 7C

METHOD AND SYSTEM FOR TRANSMISSION OVER MULTIPLE CARRIERS

CROSS REFERENCE TO RELATED APPLICATIONS

This application claims the benefit of priority to U.S. Provisional Patent Application Ser. No. 62/696,127 filed Jul. 10, 2018 and entitled "Method and System for Transmission Over Multiple Carriers", the contents of which are incorporated herein by reference.

TECHNICAL FIELD

The present invention relates generally to a system and method for wireless communications, and, in particular embodiments, to a system and method for wireless communications over bundled resources over multiple carriers.

BACKGROUND

An air interface is the wireless communications link between two or more communicating devices, such as a radio access network device (e.g., a base station, base transceiver station (BTS), a Node-B (NodeB), an evolved NodeB (eNodeB), a Home eNodeB, a gNodeB, a transmission point (TP), a site controller, an access point (AP), or a wireless router) and an electronic device (ED) (e.g., a user equipment (UE), a mobile phone, a sensor, a camera). Typically, both communicating devices need to know specific parameters of the air interface in order to successfully transmit and receive a transmission.

Configuring the communicating devices with the same air interface parameters allows the communicating devices to reliably identify, organize and use physical resources, such as time, frequency, or time and frequency resources. Frequency resources for the air interface may be divided into carriers (also referred to as "cells"), each carrier defining a bandwidth that may be allocated for a transmission from a network access device to an ED, or from an ED to a network access device. For example, a carrier may have a bandwidth of 1.4, 3, 5, 10, 15 or 20 MHz. In some situations, an ED may be configured with multiple carriers. Each carrier may be further divided into a number of bandwidth parts (BWPs), which each consist of a number of contiguous resource blocks (RBs) within the carrier and are specific to an ED. Dividing the carrier into multiple BWPs may enable savings in transmission power by transmitting over a reduced transmission bandwidth, in comparison to transmitting over the entire carrier bandwidth. The BWPs limit the physical time and frequency resources an ED may transmit and receive on. In some situations, only one of the configured BWPs within a carrier is active for the ED over a given duration. In other situations, more than one of the configured BWPs within a carrier are simultaneously active for the ED.

In current wireless communications systems, transmissions are typically communicated in accordance with one pre-defined configuration for the air interface. Modern wireless networks, however, are increasingly used to support communications of diverse traffic types, which may have different characteristics and quality of service (QoS) requirements, such as latency, throughput, and simultaneous connections. Consequently, the different traffic types of modern wireless networks are not well-suited for a one-size-fits-all air interface configuration. It is desirable to increase the flexibility and efficiency of the air interface configuration for an ED.

SUMMARY

Technical advantages are generally achieved by embodiments of this disclosure which describe a system and method for transmission over multiple carriers.

According to an aspect of the present disclosure there is provided a method that includes receiving at least one indication identifying a first carrier bundle and transmitting or receiving a first transport block (TB) over the first carrier bundle. The first carrier bundle includes a first plurality of carriers, the first plurality of carriers being a proper subset of the carriers configured for a user equipment (UE).

In some embodiments, the at least one indication identifies a second carrier bundle including at least one carrier of the carriers configured for the UE. The method further includes transmitting or receiving a second TB over the second carrier bundle.

In some embodiments, the first TB is associated with a first hybrid automatic repeat request (HARQ) entity and the second TB is associated with a second HARQ entity different from the first HARQ entity.

In some embodiments, the first carrier bundle and the second carrier bundle share at least one common carrier.

In some embodiments, a number of carriers in the first carrier bundle is different from a number of carriers in the second carrier bundle.

In some embodiments, a first hybrid automatic repeat request (HARQ) process is associated with the first TB, and a second HARQ process, different from the first HARQ process, is associated with the second TB.

In some embodiments, the at least one indication includes a configuration of higher-layer parameters on a per carrier basis for the first carrier bundle.

In some embodiments, the at least one indication includes a configuration of higher-layer parameters on a carrier bundle basis.

In some embodiments, the at least one indication includes a configuration of higher-layer parameters of a primary carrier of the first carrier bundle, and the configuration of the higher-layer parameters of the primary carrier is applied to the other carriers of the first carrier bundle.

In some embodiments, the at least one indication includes an indication of the primary carrier of the first carrier bundle.

In some embodiments, the at least one indication indicates a number of carrier bundles configured for the UE.

In some embodiments, the at least one indication identifies, for each carrier bundle, the plurality of carriers that belong to the carrier bundle.

In some embodiments, the at least one indication includes, for each of the carriers configured for the UE, an indication identifying at least one carrier bundle that the respective carrier belongs to.

In some embodiments, the at least one indication further identifies a bandwidth part (BWP) bundle as a set of BWPs configured in each carrier of the carrier bundle that have a same BWP ID.

In some embodiments, the at least one indication further includes, when only a single bandwidth part (BWP) is active in each carrier of the first carrier bundle during a given duration, identifying a BWP bundle as a set of the active BWPs in the carriers of the first carrier bundle during the given duration.

In some embodiments, the at least one indication further includes identifying a bandwidth part (BWP) bundle based upon an explicit association of BWPs in the BWP bundle.

In some embodiments, the method is performed by the UE.

According to another aspect of the present disclosure there is provided a user equipment (UE) including a transceiver to receive at least one indication identifying a first carrier bundle, the first carrier bundle comprising a first plurality of carriers, the first plurality of carriers being a proper subset of the carriers configured for the UE, wherein the transceiver transmits or receives a first transport block (TB) over the first carrier bundle.

In some embodiments, the at least one indication identifies a second carrier bundle including at least one carrier of the carriers configured for the UE, and wherein the transceiver transmits or receives a second TB over the second carrier bundle.

In some embodiments, the first TB is associated with a first hybrid automatic repeat request (HARQ) entity and a first HARQ process, and the second TB is associated with a second HARQ entity different from the first HARQ entity and a second HARQ process different from the first HARQ process.

In some embodiments, the at least one indication includes a configuration of higher-layer parameters of a primary carrier of the first carrier bundle; and wherein the configuration of the higher-layer parameters of the primary carrier is applied to the other carriers of the first carrier bundle.

In some embodiments, the at least one indication includes an indication of the primary carrier of the first carrier bundle.

In some embodiments, the at least one indication identifies, for each carrier bundle, the plurality of carriers that belong to the carrier bundle.

In some embodiments, the at least one indication includes, for each of the carriers configured for the UE, an indication identifying at least one carrier bundle that the respective carrier belongs to.

In some embodiments, the at least one indication further identifies a bandwidth part (BWP) bundle as a set of BWPs configured in each carrier of the carrier bundle that have a same BWP ID.

In some embodiments, the at least one indication further includes, when only a single bandwidth part (BWP) is active in each carrier of the first carrier bundle during a given duration, identifying a BWP bundle as a set of the active BWPs in the carriers of the first carrier bundle during the given duration.

In some embodiments, the at least one indication further comprises identifying a bandwidth part (BWP) bundle based upon an explicit association of BWPs in the BWP bundle.

According to another aspect of the present disclosure there is provided a method that includes receiving at least one indication identifying a first bandwidth part (BWP) bundle and transmitting or receiving a first transport block (TB) over the first BWP bundle. The first BWP bundle includes a first plurality of BWPs, where each BWP of the first plurality of BWPs includes a set of contiguous resource blocks within a carrier of a plurality of carriers, the plurality of carriers being a proper subset of carriers configured for a user equipment (UE).

In some embodiments, the at least one indication identifies a second BWP bundle including at least one BWP within the plurality of carriers. The method further includes transmitting or receiving a second TB over the second BWP bundle.

In some embodiments, the first TB is associated with a first hybrid automatic repeat request (HARQ) entity and the second TB is associated with a second HARQ entity different from the first HARQ entity.

In some embodiments, the first BWP bundle and the second BWP bundle share at least one common BWP.

In some embodiments, a number of BWPs in the first BWP bundle is different from a number of BWPs in the second BWP bundle.

In some embodiments, the at least one indication identifies the first BWP bundle as a set of BWPs configured in each carrier of the plurality of carriers that have a same BWP ID.

In some embodiments, the at least one indication identifying the first BWP bundle includes, when only a single BWP is active in each carrier of the plurality of carriers during a given duration, identifying the first BWP bundle as a set of the active BWPs in the carriers of the plurality of carriers during the given duration.

In some embodiments, the at least one indication comprises identifying the first BWP bundle based upon an explicit association of the BWPs in the first BWP bundle.

In some embodiments, a first hybrid automatic repeat request (HARQ) process is associated with the first TB, and a second HARQ process, different from the first HARQ process, is associated with the second TB.

In some embodiments, the at least one indication includes a configuration of higher-layer parameters on a per BWP basis for the first BWP bundle.

In some embodiments, the at least one indication includes a configuration of higher-layer parameters on a BWP bundle basis.

In some embodiments, the at least one indication includes a configuration of higher-layer parameters of a primary BWP of the first BWP bundle and the configuration of the higher-layer parameters of the primary BWP is applied to the other BWPs of the first BWP bundle.

In some embodiments, the at least one indication includes an indication of the primary BWP of the first BWP bundle.

In some embodiments, the method is performed by the UE.

According to yet another aspect of the present disclosure there is provided a method that includes transmitting at least one indication identifying a first carrier bundle and transmitting or receiving a first transport block (TB) over the first carrier bundle. The first carrier bundle includes a first plurality of carriers, the first plurality of carriers being a proper subset of the carriers configured for a user equipment (UE).

In some embodiments, the method is performed by a base station.

According to yet another aspect of the present disclosure there is provided a method that includes transmitting at least one indication identifying a first bandwidth part (BWP) bundle and transmitting or receiving a first transport block (TB) over the first BWP bundle. The first BWP bundle includes a first plurality of BWPs, where each BWP of the first plurality of BWPs includes a set of contiguous resource blocks within a carrier of a plurality of carriers, the plurality of carriers being a proper subset of carriers configured for a user equipment (UE).

In some embodiments, the method is performed by a base station.

According to yet another aspect of the present disclosure there is provided a user equipment (UE) configured to perform any of the methods described herein.

According to yet another aspect of the present disclosure there is provided a base station configured to perform any of the methods described herein.

According to yet another aspect of the present disclosure there is provided an apparatus including at least one antenna, a processor, and a non-transitory computer readable storage medium storing processor executable instructions for execution by the processor, the processor executable instructions including instructions causing the apparatus to perform any of the methods described herein.

BRIEF DESCRIPTION OF THE DRAWINGS

For a more complete understanding of the present invention, and the advantages thereof, reference is now made to the following description taken in conjunction with the accompanying drawings, in which:

FIG. 5B is table summarizing various performance trade-offs for one TB mapped per configured carrier, for one TB mapped to all configured carriers, and for carrier or BWP bundling according to an aspect of the present application.

FIG. 6A is a schematic diagram illustrating an example of non-overlapping carrier bundles, each bundle including two carriers.

FIG. 6B is a schematic diagram illustrating an example of overlapping carrier bundles, each bundle including two carriers and one of the carriers being common to both carrier bundles.

FIG. 6C is a schematic diagram illustrating an example of non-overlapping carrier bundles in which the carrier bundles have different numbers of carriers.

FIG. 7B is a schematic diagram illustrating an example of overlapping BWP bundles, each bundle including two BWPs and one of the BWPs of each bundle being common to at least two bundles.

FIG. 7C is a schematic diagram illustrating an example of non-overlapping BWP bundles in which the bundles have different numbers of BWPs.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of the disclosure relate to bundling physical resources for flexible and efficient resource configuration for an ED. Further aspects relate to bundling configured carriers and BWPs for an ED.

The following paragraphs provide context in the form of the description of an overall system that includes both base stations and electronic devices served by the base stations.

Figure 1:
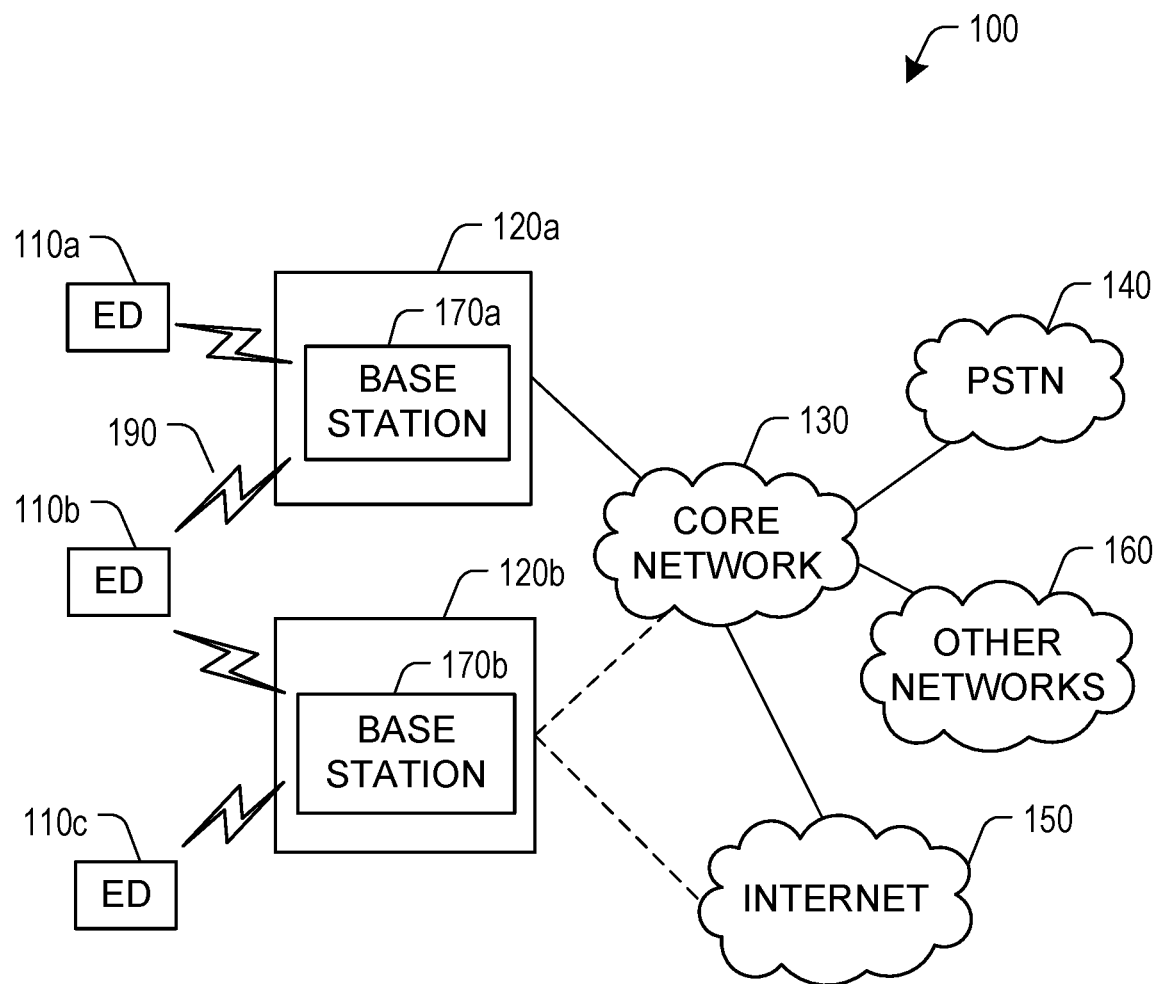
FIG. 1 is a network diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 or the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), and/or relay nodes. The functions of a base station 170a, 170b may be localized to a single location, as shown, or be distributed within the network, such as distributed in the corresponding RAN. Also, the base station 170b forms part of the RAN 120b, which may include other base stations. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells if they are supported by the radio access technology. In some embodiments, multiple transceivers could be used for each cell, for example using multiple-input multiple-output (MIMO) technology. The number of RAN 120a-120b shown is an example only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HSPA (HSPA+) optionally including High Speed Downlink Packet Access (HSDPA), High Speed Packet Uplink Access (HSUPA), or both. Alternatively, a base station 170a-170b may establish an air interface 190 with Evolved UTMS Terrestrial Radio Access (E-UTRA) using Long-Term Evolution (LTE), LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), and User Datagram Protocol (UDP). EDs 110a-110c may be multimode devices capable of operation according to multiple radio access technologies, and incorporate multiple transceivers necessary to support such.

In embodiments of the present invention, the communications system 100 is a heterogeneous communications system with different transmission source types and/or different transmission destination types. The different transmission source types may have different transmission capabilities. The different transmission destination types may have different reception capabilities.

In the heterogeneous communications system, the EDs 110a-110c of FIG. 1 include different types of devices having different capabilities and requirements. More specifically, each ED 110a-110c may be associated with a different traffic type having particular requirements for QoS, latency, throughput, simultaneous connections, etc. Example EDs 110a-110c associated with different traffic types may include a smartphone, a computer, a television, a security camera, a sensor, a thermostat, a heart rate monitor, etc. In a particular example, ED 110a is a computer, ED 110b is a sensor, and ED 110c is a heart rate monitor. Each of the EDs 110a-110c may have different wireless communication capabilities and requirements.

Furthermore, in a heterogeneous communications system, the base stations 170a-170b may communicate with one or more of the EDs 110a-110c over one or more software-configurable air interfaces 190 using wireless communication links. The different radio access network devices (e.g., base stations 170a-170b) and electronic devices (e.g., ED 110a-110c) may have different transmission capabilities and/or requirements. As an example, an eNB may have multiple transmit antennas. A picocell may only have one transmit antenna or a relatively small number of transmit antennas. Additionally, a picocell may transmit at a lower maximum power level as compared to an eNB. Similarly, a computer may have much higher data bandwidth requirement and signal processing capability than a sensor. For another example, a heart rate monitor may have much stricter latency and reliability requirements than a television.

Therefore, in a heterogeneous communications system, such as heterogeneous communications system 100, different pairs of communicating devices (i.e., a network device and an electronic device; or a network device and another network device; or an electronic device and another electronic device) may have different transmission capabilities and/or transmission requirements. The different transmission capabilities and/or transmission requirements can be met by the availability to select different air interface configurations for different devices, communications, or requirements.

In fifth generation (5G) New Radio (NR), different devices and services are expected to have different requirements for wireless communication. For example, some devices may require low-latency communication (e.g., less than 0.5 ms round trip) with high reliability (e.g., less than $10^{-5}$ block error rate (BLER)). These devices are proposed to communicate in a framework sometimes known as ultra-reliable low-latency communication (URLLC). URLLC may be unpredictable and sporadic in nature, and may not require a high data rate depending on the application. URLLC may be used in either uplink (UL) or downlink (DL), and may be particularly applicable in cases such as vehicle-to-vehicle (V2V) communication for coordinating automobile traffic.

To satisfy the latency and reliability requirements of URLLC communication, a number of features are proposed that differ from conventional Long Term Evolution (LTE) communication and from NR enhanced mobile broadband (eMBB) communication.

In some examples, a portion of network resources, for example time-frequency resources such as one or more bandwidth parts (BWPs), is reserved for URLLC traffic and a different portion of network resources is reserved for eMBB traffic. Network resources that are used for URLLC traffic may be configured to increase flexibility or reduce latency, for example by having a finer granularity or periodicity of scheduling than the slot-based scheduling of eMBB, or a shorter minimum duration. URLLC transmissions in the physical downlink shared channel (PDSCH) or the physical uplink shared channel (PUSCH) may be as short as two symbols. The first symbol of an URLLC transmission may include a demodulation reference signal (DMRS).

Figure 2:
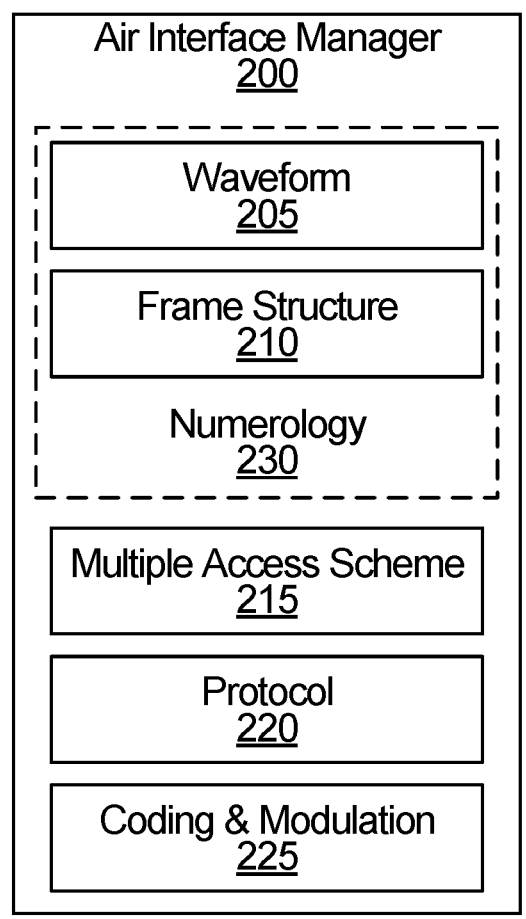
FIG. 2 is a block diagram of an air interface manager for configuring a software-configurable air interface.

FIG. 2 illustrates a schematic diagram of an air interface manager 200 for configuring a software-configurable air interface 190. Air interface manager 200 may be, for example, a module comprising a number of components or building blocks that define the parameters of the air interface 190 and collectively specify how a transmission is to be made and/or received by the air interface 190.

The components of the air interface manger 200 include at least one of a waveform component 205, a frame structure component 210, a multiple access scheme component 215, a protocol component 220, and a coding and modulation component 225.

The waveform component 205 may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

The frame structure component 210 may specify a configuration of a frame or group of frames. The frame structure component 210 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as sub-carrier spacing width, symbol duration, cyclic prefix (CP) length, channel bandwidth, guard bands/subcarriers, and sampling size and frequency.

Additionally, the frame structure component 210 may further specify whether the frame structure is used in a time-division duplex communication or a frequency-division duplex communication.

Together, the specifications of the waveform component and the frame structure component are sometimes known as the "numerology." Thus, the air interface 190 may include a numerology component 230 defining a number of air interface configuration parameters, such as the sub-carrier spacing, CP length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing maybe compatible with LTE or serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 215 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access, non-orthogonal multiple access, orthogonal multiple access, e.g., via a dedicated channel resource (i.e., no sharing between multiple EDs), contention-based shared channel resource, non-contention-based shared channel resource, and cognitive radio-based access.

The protocol component 220 may specify how a transmission and/or a re-transmission are to be made. Non-limiting examples of transmission and/or re-transmission mechanism options include those that specify a scheduled data pipe size and a signaling mechanism for transmission and/or re-transmission.

The coding and modulation component 225 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low Peak-to-Average Power Ratio (PAPR) modulation.

Because an air interface comprises a plurality of components or building blocks, and each component may have a plurality of candidate technologies (also referred to herein as air interface capability options), the air interface manager 200 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 200 and used for communications between the pair of communicating transmitting-receiving devices.

In further embodiments, the air interface manager 200 may modify or update its components, profiles, or capability options. For example, the air interface manager 200 may replace the waveform and frame structure components 205, 210, with a single numerology component 230. Conversely, the air interface manager 200 may separate the coding and modulation component 225 into an individual coding component and an individual modulation component. Furthermore, the air interface manager 200 is configurable such that new soft air interface configuration components developed in the future should be able to be utilized.

The air interface manager 200 may also update certain components to modify the capability options of any given component. For example, the air interface manager 200 may update the modulation and coding component 225 to include higher-order modulation schemes.

By updating the stored components, profiles, and candidate options, the air interface manager 200 can flexibly adapt to better accommodate diverse wireless traffic types and services. Modifying or updating components, profiles, and candidate options may allow the air interface manager 200 to provide suitable air interface profiles for traffic types or services other than those already contemplated for ultra-reliable low latency communications (URLLC), enhanced mobile broadband (eMBB), and massive machine-type communications (mMTC).

Figure 3A:
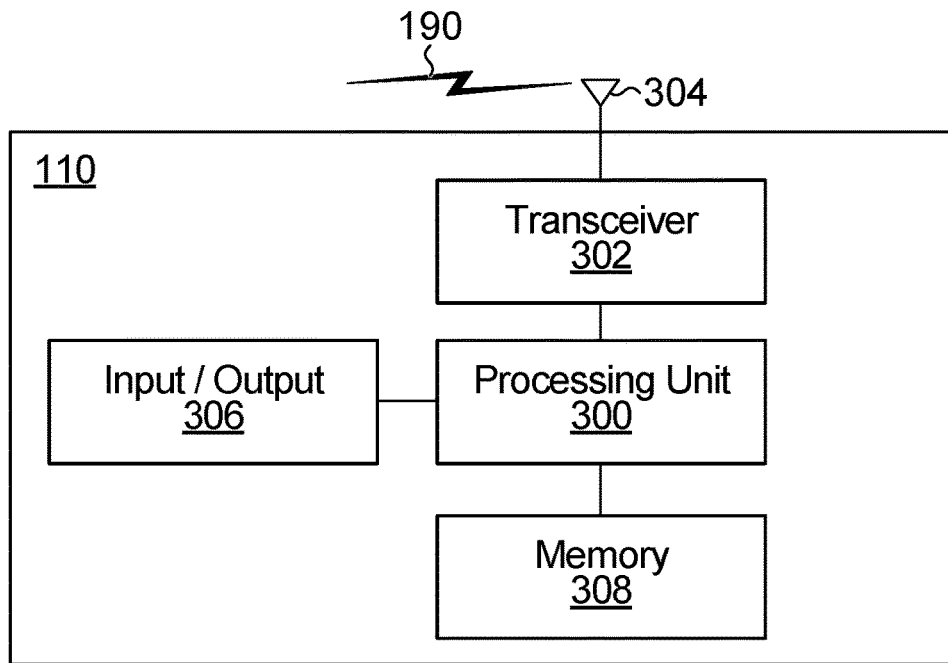
FIG. 3A is a block diagram of an example client side electronic device.
Figure 3B:
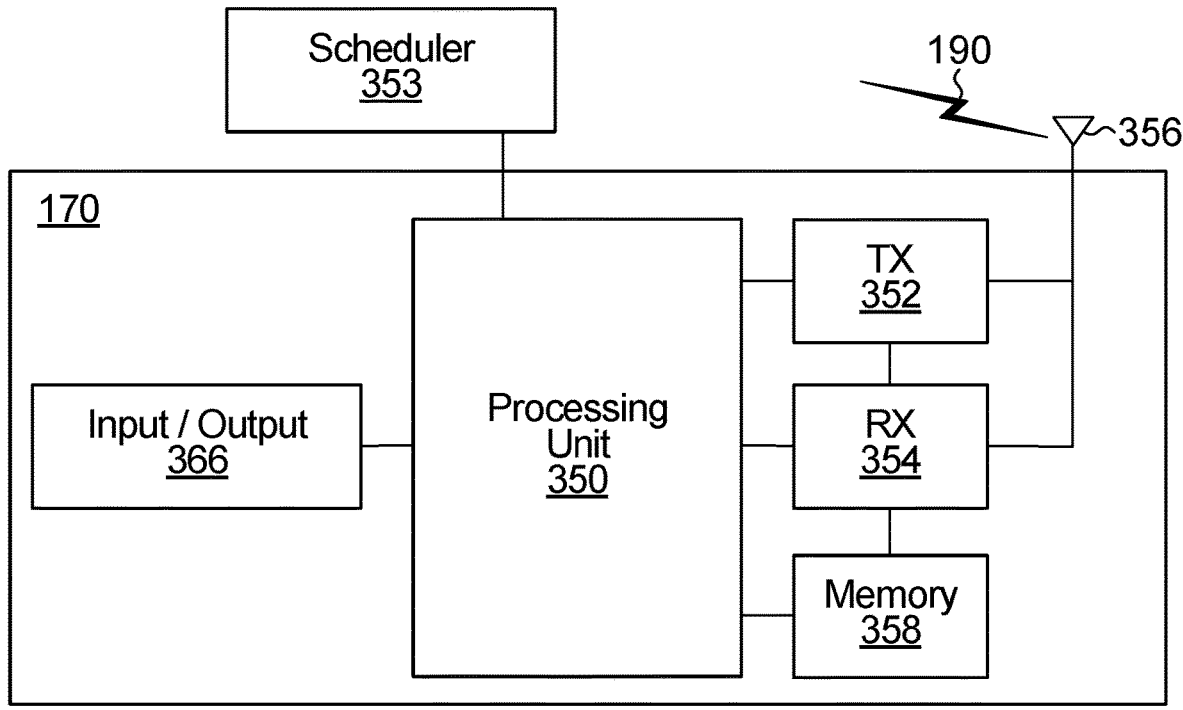
FIG. 3B is a block diagram of an example radio access network device.

FIGS. 3A and 3B illustrate example devices that may implement the methods and teachings according to this disclosure. In particular, FIG. 3A illustrates an example ED 110, and FIG. 3B illustrates an example base station 170. These components could be used in the communication system 100 or in any other suitable system.

As shown in FIG. 3A, the ED 110 includes at least one processing unit 300. The processing unit 300 implements various processing operations of the ED 110. For example, the processing unit 300 could perform signal coding, data processing, power control, input/output processing, or any other functionality enabling the ED 110 to operate in the communication system 100. The processing unit 300 may also be configured to implement some or all of the functionality and/or embodiments described in more detail above. Each processing unit 300 includes any suitable processing or computing device configured to perform one or more operations. Each processing unit 300 could, for example, include a microprocessor, microcontroller, digital signal processor, field programmable gate array, or application specific integrated circuit.

The ED 110 also includes at least one transceiver 302. The transceiver 302 is configured to modulate data or other content for transmission by at least one antenna 304 or Network Interface Controller (NIC). The transceiver 302 is also configured to demodulate data or other content received by the at least one antenna 304. Each transceiver 302 includes any suitable structure for generating signals for wireless or wired transmission and/or processing signals received wirelessly or by wire. Each antenna 304 includes any suitable structure for transmitting and/or receiving wireless or wired signals. One or multiple transceivers 302 could be used in the ED 110. One or multiple antennas 304 could be used in the ED 110. Although shown as a single functional unit, a transceiver 302 could also be implemented using at least one transmitter and at least one separate receiver.

The ED 110 further includes one or more input/output devices 306 or interfaces (such as a wired interface to the internet 150). The input/output devices 306 permit interaction with a user or other devices in the network. Each input/output device 306 includes any suitable structure for providing information to or receiving information from a user, such as a speaker, microphone, keypad, keyboard, display, or touch screen, including network interface communications.

In addition, the ED 110 includes at least one memory 308. The memory 308 stores instructions and data used, generated, or collected by the ED 110. For example, the memory 308 could store software instructions or modules configured to implement some or all of the functionality and/or embodiments described above and that are executed by the processing unit(s) 300. Each memory 308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 350, at least one transmitter (TX) 352, at least one receiver (RX) 354, one or more antennas 356, at least one memory 358, and one or more input/output devices or interfaces 366. A transceiver, not shown, may be used instead of the transmitter 352 and receiver 354. A scheduler 353 may be coupled to the processing unit 350. The scheduler 353 may be included within or operated separately from the base station 170. The processing unit 350 implements various processing operations of the base station 170, such as signal coding, data processing, power control, input/output processing, or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, microcontroller, digital signal processor, field programmable gate array, or application specific integrated circuit.

Each transmitter 352 includes any suitable structure for generating signals for wireless or wired transmission to one or more EDs or other devices. Each receiver 354 includes any suitable structure for processing signals received wirelessly or by wire from one or more EDs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the ED 110. The memory 358 stores instructions and data used, generated, or collected by the base station 170. For example, the memory 358 could store software instructions or modules configured to implement some or all of the functionality and/or embodiments described above and that are executed by the processing unit(s) 350.

Each input/output device 366 permits interaction with a user or other devices in the network. Each input/output device 366 includes any suitable structure for providing information to or receiving/providing information from a user, including network interface communications.

Embodiments that may be implemented on one or more of the devices illustrated in FIGS. 1, 2, 3A and 3B will now be described in detail.

Figure 4A:
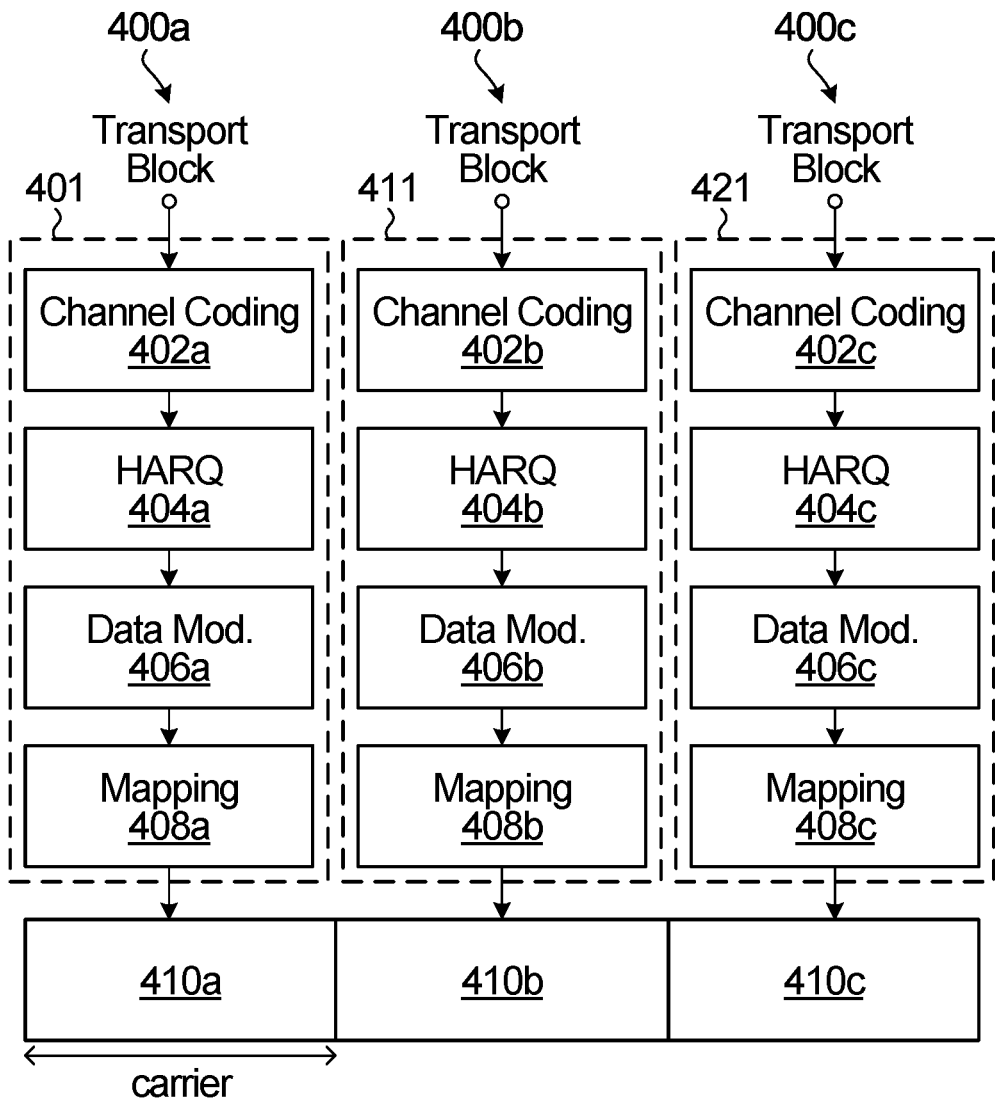
FIG. 4A is a flow diagram illustrating an example of configuring multiple transport blocks (TBs) for transmission on a one TB per carrier basis.

FIG. 4A is a flow diagram illustrating a conventional manner of configuring multiple transport blocks (TBs) for transmission over multiple carriers. In particular, each transport block is configured for transmission on a single carrier. A first transmission chain 401 includes functionality for channel coding 402a, hybrid automatic repeat request (HARQ) processes 404a, data modulation 406a and mapping 408a of symbols to physical resources in the first carrier 410a. A second transmission chain 411 for a second carrier 410b and a third transmission chain 421 for a third carrier 410c respectively include channel coding 402b and 402c, HARQ processes 404b and 404c, data modulation 406b and 406c and mapping 408b and 408c. FIG. 4A may represent transmission by a base station to a UE. Alternatively, FIG. 4A may represent a transmission by a UE to a base station.

In FIG. 4A, referring to transmission chain 401, the TB 400a includes control signals and/or data for transmission over the air interface. The control signals and data may be provided by higher-layer signaling, such as radio resource control (RRC) signaling or medium access control (MAC) signaling.

Channel coding 402a is performed on TB 400a. Channel coding may be performed to improve the reliability of the transmission over the air interface using forward error correction and/or error detection. The quality of the channel between the base station and the UE may influence the coding scheme applied during channel coding 402a, 402b and 402c. HARQ process 404a is also associated with TB 400a, to provide forward error correction and error detection. In the case that TB 400a cannot be decoded successfully at the receiver, a negative acknowledgement (NACK) message will be received by the respective HARQ process, which will retransmit the TB or a different redundancy version of the TB. Data modulation 406a modulates TB 400a according to a modulation scheme to create symbols for transmission. Channel coding and modulation are described in more detail above with reference to the modulation and coding component 225 in FIG. 2. In some embodiments, channel coding 402a, HARQ processes 404a and data modulation 406a may be configured according to modulation and coding component 225 in FIG. 2. HARQ process 404a may be performed by a HARQ entity. The HARQ entity may be implemented in the form of software, firmware, designated circuitry or computer-readable media storing instructions thereon that when executed perform the HARQ processes. The HARQ entity may also be implemented as a part of a UE or base station.

Mapping 408a is performed to map the modulated symbols onto the physical resources allocated for transmission of TB 400a.

Second and third transmission chains 411 and 421 operate similar to the first transmission chain 401 as described above.

In the case of FIG. 4A, TBs 400a, 400b and 400c are mapped onto carriers 410a, 410b and 410c, respectively. Carriers 410a, 410b and 410c represent all of the carriers that are configured for the UE over a given duration. Carriers 410a, 410b and 410c may be configured for the UE using higher-layer signaling. By configuring carriers 410a, 410b and 410c for the UE, at least part of the bandwidth associated with the carriers may be used by the UE for transmitting and receiving TBs. Carriers 410a, 410b and 410c may also be configured with BWPs for the UE. Mapping 408a, 408b and 408c of symbols may be performed onto BWPs of a carrier as opposed to the entire bandwidth of a carrier. Although FIG. 4A only illustrates three carriers, in general, more or fewer carriers may be configured to the UE.

In FIG. 4A, each of TBs 400a, 400b and 400c are transmitted over a single carrier configured for the UE. This method may result in a relatively high link adaptation performance. For example, the modulation and coding scheme (MCS), rank and pre-coding matrix indicator (PMI) may be adapted for each of carriers 410a, 410b and 410c by adjusting each of channel coding 402a, 402b and 402c, HARQ processes 404a, 404b and 404c and data modulation 406a, 406b and 406c independently for each respective carrier, or TB, or carrier and TB. In addition, HARQ efficiency may be relatively high, because the number of simultaneously active HARQ processes 404a, 404b and 404c is the same as the number of carriers 410a, 410b and 410c. Therefore, forward error correction and error detection in HARQ processes 404a, 404b and 404c may be chosen based on the channel conditions for each of carriers 410a, 410b and 410c. In addition, a NACK for one of TBs 400a, 400b and 400c only requires a retransmission on one carrier.

However, there may be drawbacks associated with the method illustrated in FIG. 4A. For example, in the case that the bandwidth of each of carriers 410a, 410b and 410c is relatively small, the diversity and coding gain achieved in the carriers may be low. The HARQ soft buffer is also non-sharing, therefore the HARQ processes are independent of each other. In addition, downlink control information (DCI) overhead for the transmission of each of TBs 400a, 400b and 400c may be relatively high for a large packet transmission, because a separate DCI is required for each of carriers 410a, 410b and 410c. Channel state information (CSI) must also be determined for each the carriers 410a, 410b and 410c independently, resulting in larger CSI feedback overhead.

Figure 4B:
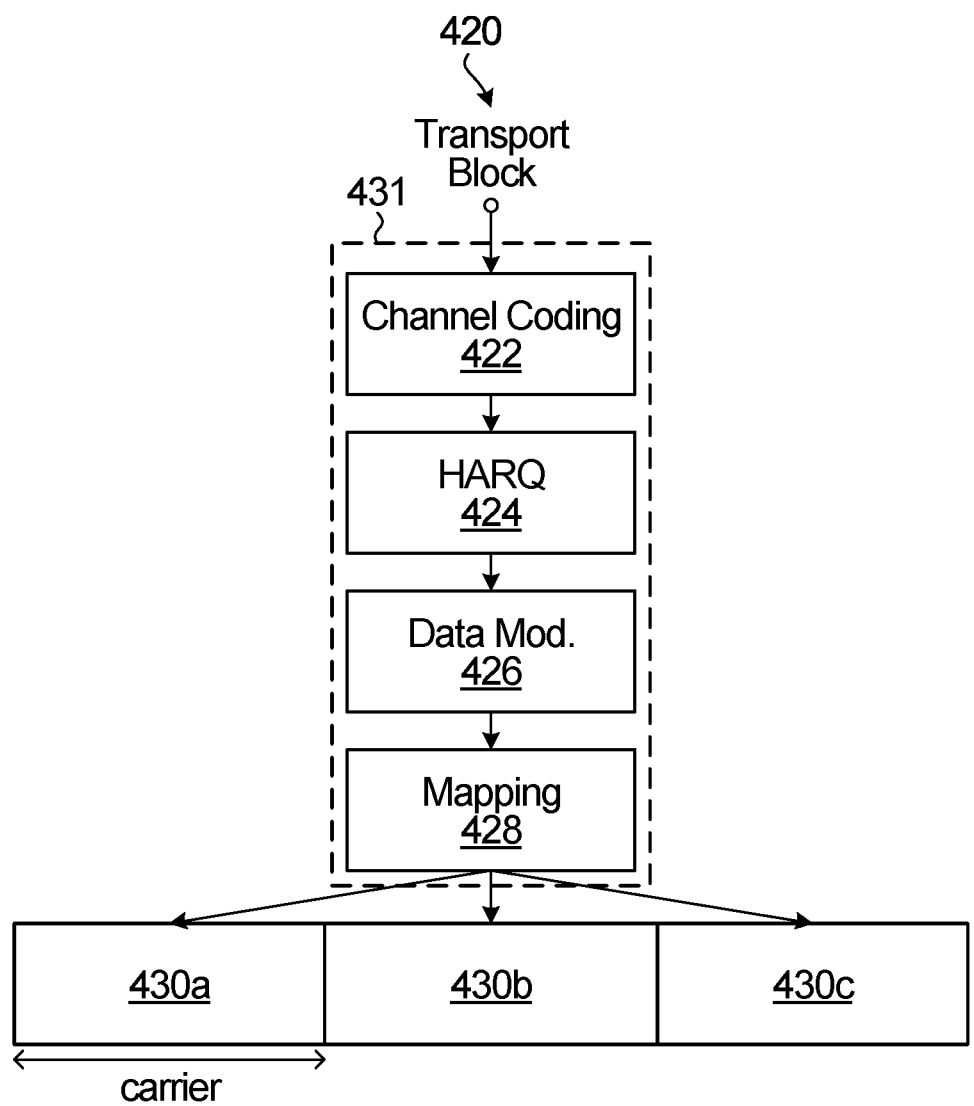
FIG. 4B is a flow diagram illustrating an example of configuring one TB for transmission on a one TB over all carriers configured for a user equipment (UE) basis.

Another conventional method for transmitting a TB is shown in FIG. 4B, which is a flow diagram illustrating how a single TB is configured for transmission over multiple carriers configured for the UE. FIG. 4B illustrates TB 420 provided to a single transmission chain 431 including channel coding 422, HARQ process 424 and data modulation 426. The functionality of these features generally corresponds to channel coding 402a, 402b and 402c, HARQ processes 404a, 404b and 404c and data modulation 406a, 406b and 406b, which are described in detail above with reference to FIG. 4A. FIG. 4B also includes mapping 428, which is connected sequentially to data modulation 426. The method of FIG. 4B may be performed by a UE or by a base station.

In FIG. 4B, mapping 428 is performed onto multiple carriers 430a, 430b, and 430c, which represent all of the carriers configured for the UE. Mapping 428 of symbols to carriers 430a, 430b and 430c is different than the mapping 408a, 408b and 408c of symbols to carriers 410a, 410b and 410c in FIG. 4A. Mapping 428 maps symbols of a single TB onto the multiple carriers. Therefore, the carriers 430a, 430b and 430c may be considered to be aggregated for the transmission of the TB 420.

By transmitting the TB 420 over all of the carriers 430a, 430b and 430c configured for the UE, the TB 420 is transmitted over a wider bandwidth. This wider bandwidth may lead to improved diversity and coding gain, HARQ soft buffer sharing, joint CSI for multiple carriers, and reduced DCI overhead when compared to the method of FIG. 4A. However, the method of FIG. 4B may suffer from reduced link adaptation performance and reduced HARQ efficiency when compared to the method of FIG. 4A.

It is apparent that a performance trade-off exists between the methods illustrated in FIG. 4A and FIG. 4B, at least in terms of diversity and coding gain, DCI overhead, link adaptation performance, HARQ efficiency and HARQ soft buffer sharing. In some sense, transmitting a TB on each configured carrier (e.g., the method of FIG. 4A) and transmitting one TB over all the configured carriers (e.g., the method of FIG. 4B) represent two extremes in terms of association of TBs to carriers. For some applications and traffic types, these two extremes may not offer a suitable performance. Some aspects of the disclosure relate to a flexible approach to associating TBs to carriers, such that an improved performance trade-off may be achieved.

Figure 5A:
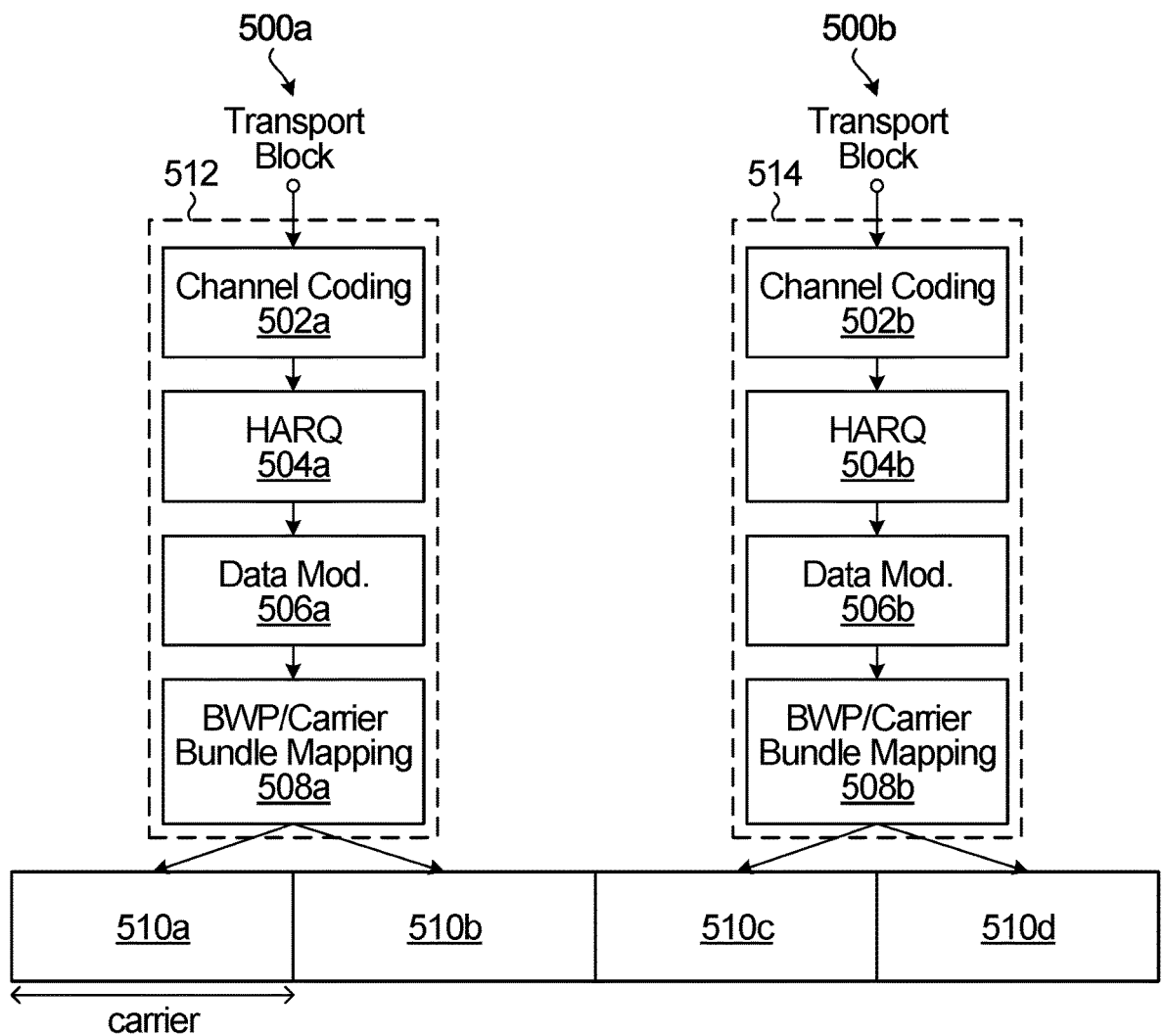
FIG. 5A is a flow diagram illustrating an example of configuring multiple transport blocks (TBs) for transmission, each TB mapped over a carrier bundle according to an aspect of the present application.

FIG. 5A is a flow diagram illustrating transmission of TBs over carrier bundles or BWP bundles according to an embodiment of the present application. FIG. 5A includes a first transmission chain 512 that configures a first transport block 500a for transmission. The first transmission chain 512 includes functionality for channel coding 502a, HARQ processes 504a and data modulation 506a. These features generally correspond to channel coding 402a, 402b and 402c, HARQ processes 404a, 404b and 404c, and data modulation 406a, 406b and 406c, which are described in detail above with reference to FIG. 4A. FIG. 5 also includes BWP/carrier bundle mapping 508a connected to data modulation 506a. The output of BWP/carrier bundle mapping 508a can be mapped onto carriers 510a and 510b in a manner described in further detail below. A second transmission chain 514 includes channel coding 502b, HARQ processes 504b, data modulation 506b, and BWP/carrier bundle mapping 508b, which are similar to the comparable functions in the first transmission chain 512. The output of BWP/carrier bundle mapping 508b can be mapped onto carriers 510c and 510d. The carriers 510a, 510b, 510c and 510d represent carriers configured for the UE, which may include one or more BWPs. The method of FIG. 5A may be performed by a UE or a base station, similar to FIG. 4A and FIG. 4B.

The BWP/carrier bundle mapping 508a represents mapping of the TB 500a onto a carrier bundle or a BWP bundle, or both. Carrier bundles and BWP bundles define bundles of physical resources configured for the UE and specific to the UE. Carrier bundles consist of a proper subset of the configured carriers for a UE, and at most one TB may be transmitted over each carrier bundle over a given duration (excluding TBs that are scheduled simultaneously over different antenna ports or MIMO layers). Proper subset, as used herein, refers to a subset that includes some but not all of the elements within a set. For example, if A represents a set of all of the carriers configured for a UE over a given duration, and B represents a proper subset of A, there exists at least one carrier that belongs to A that does not belong to B. A carrier bundle may be configured with higher-layer parameters specific to the carriers of that carrier bundle.

As illustrated in FIG. 5A, the BWP/carrier bundle mapping 508a includes mapping the TB 500a on the carriers 510a and 510b, and the BWP/carrier bundle mapping 508b includes mapping the TB 500b on the carriers 510c and 510d. Therefore, the carriers 510a and 510b form a first carrier bundle and the carriers 510c and 510d form a second carrier bundle. The carrier bundles may also be considered new cell types, and could be referred to as "cell type-2" or "cell type-B".

The BWP/carrier bundle mappings 508a and 508b may also, or instead, include mapping the TBs 500a and 500b, respectively, onto BWP bundles configured for the UE. For example, the carriers 510a, 510b, 510c and 510d may each include one or more BWPs configured for the UE by the network. BWP bundles are specific to a UE. The configuration of the BWPs bundles may be performed through higher-layer signaling or downlink control information (DCI). BWP bundles, as described in the present application, may be considered a new BWP type in comparison to other known BWP types. BWP bundles could be differentiated from known BWP types by a nomenclature such as "BWP type-2", or "BWP type-B". BWP bundles consist of a proper subset of the configured BWPs for a UE, and at most one TB may be transmitted over each BWP bundle over a given duration (excluding TBs that are scheduled simultaneously over different antenna ports or MIMO layers).

The BWPs may be implemented to decrease the bandwidth within a carrier that the UE is required to transmit or receive on over a given duration. This may result in power savings due to the possibility of operating the UE with a lower sampling rate and reduced baseband processing. BWPs may also reduce the bandwidth the UE is required to monitor when attempting to read information in a DCI via a process known as "blind decoding". BWPs are configured by at least one control resource set (CORESET).

A CORESET is a set of physical time and frequency resources for possible transmission of a PDCCH. A number of search spaces are configured and associated with each CORESET. The location of the PDCCH containing the DCI, in physical time and frequency transmission resources, is not previously known to the UE. Therefore, the UE must blindly search for the PDCCH in a search space by making repeated attempts to decode PDCCH candidates in the search space. Decoding of the PDCCH candidates is computationally intensive. The larger the number of blind decodings performed at the UE, the higher the complexity at the UE due to time and processing constraints. In order to limit the complexity, the number of blind decodings in a slot should be limited. Reducing the bandwidth the UE is required to monitor by configuring BWPs is one method for limiting the complexity of blind decodings.

Different BWPs within a carrier may also be configured with different numerologies. In some embodiments, different BWPs within a carrier may be configured with numerologies for different services. For example, a first BWP may be configured with a numerology suitable for URLLC communications, and a second BWP may be configured with a numerology suitable for eMBB communications. In this sense, one carrier is configured for multiple services.

Referring again to FIG. 5A, BWP bundles may be formed by bundling one or more BWPs of the carriers 510a, 510b, 510c and 510d. Specifically, one or more BWPs in carrier 510a and one or more BWPs in carrier 510b may form a BWP bundle that the BWP/carrier bundle mapping 508a maps the TB 500a onto. Similarly, one or more BWPs in the carrier 510c and one or more BWPs in the carrier 510d may form a BWP bundle that the BWP/carrier bundle mapping 508b maps the TB 500b onto.

In FIG. 5A, the TB 500a is configured for transmission over a carrier bundle, a BWP bundle, or a BWP bundle within a carrier bundle. Similar comments apply to transmitting the transport block 500b. Although BWP/carrier bundle mappings 508a and 508b are illustrated as mapping TBs onto carrier bundles including two carriers, other examples of carrier bundles may include more or fewer carriers. Similarly, any number of BWPs may be included in a BWP bundle. BWP bundles may be configured in association with carrier bundles, or BWP bundles and carrier bundles may be configured independently. If at most one BWP is active in carriers 510a and 510b over a given duration, then the BWP bundle and the carrier bundle may be considered to be equivalent over that duration.

The configuration of carrier bundles and/or BWP bundles may lead to improved flexibility in the configuration of physical resources for TB transmission. In some embodiments, this flexibility allows for various numbers of carriers or various carrier bandwidths to be provided. For example, in a deployment with many (possibly narrowband) component carriers, a carrier bundle or BWP bundle may be configured to enhance communication over a number of (possibly narrowband) component carriers. One specific example is a deployment with an irregular spectrum where several (possibly scattered) narrowband parts of spectrum are utilized by the network. As described above with reference to FIGS. 4A and 4B, high diversity and coding gain, and high HARQ efficiency may not be achievable using one TB per configured carrier or one TB for all configured carriers. However, using the method of FIG. 5A, a carrier bundle or BWP bundle, or both, may be configured with suitable resources to meet these requirements. In this sense, transmitting a TB over each carrier bundle or BWP bundle, or both, may provide a flexible, and in some cases improved, performance trade-off in terms of diversity and coding gain, DCI overhead, link adaptation performance, HARQ efficiency and HARQ soft buffer sharing, for example.

Performance of link adaptation, diversity gain and coding gain, HARQ efficiency, HARQ soft buffer, CSI feedback and DCI overhead are summarized in the table of FIG. 5B for each of one TB per configured carrier, one TB for each configured carrier, and carrier/BWP bundling.

Some aspects of the disclosure relate to configuring a UE with a number of parallel or simultaneous TB transmissions (excluding TBs that are transmitted over different antenna ports or multiple-input multiple-output (MIMO) layers), a number of HARQ entities, and a number of parallel or simultaneous HARQ processes. In some embodiments, these numbers are equivalent and denoted by N. In further embodiments, each TB may be associated with a respective HARQ entity and a respective HARQ process. Different methods for associating N to carrier bundles and BWP bundles are provided below, which may provide flexibility in terms of the transmission of TBs over carrier bundles and/or BWP bundles.

In some embodiments, the value of N defined above is equivalent to the number of carrier bundles configured for a UE. Three different examples of bundling carriers are illustrated in FIGS. 6A, 6B and 6C. These embodiments may relate to a UE configured with at most one active BWP per carrier over a given duration.

Referring to FIG. 6A, shown is a block diagram illustrating an example of carrier bundles configured for a UE. FIG. 6A includes carriers 600, 602, 604 and 606. FIG. 6A also illustrates how the carriers 600, 602, 604 and 606 are bundled in a non-overlapping manner to form carrier bundles 610 and 612. As illustrated, the carrier bundle 610 includes the carriers 600 and 602, and the carrier bundle 612 includes the carriers 604 and 606.

In the example of FIG. 6A, the value of N is equal to the number of carrier bundles, and therefore the value of N is equal to 2. A respective TB may be scheduled for transmission over each of the carrier bundles 610 and 612 in parallel. For each of the TBs, HARQ processing by a respective HARQ entity is also performed, as described above with reference to FIG. 4A.

The transmission of a TB over the carrier bundle 610 may be performed anywhere within the bandwidth of the carriers 600 and 602. In some embodiments, the portions of the bandwidth configured for the UE are BWPs. If BWPs are configured for the UE in the carriers 600, 602, 604 and 606, the transmission of a TB over the carrier bundle 610 is performed anywhere within the bandwidth of the BWPs configured in the carriers 600 and 602. Furthermore, if there is at most one BWP active for the UE over a given duration in each of the carriers, the carrier bundles 610 and 612 may also be considered to be BWP bundles. Scheduling the transmission of a TB over a carrier bundle may be performed in a number of different ways. In one example, a TB may be scheduled for transmission over the carrier bundle 610 by explicitly indicating that the carrier bundle 610 is to be used for the transmission. In another example, a TB may be scheduled for transmission over the carrier 600 (or 602) or a BWP of the carrier 600 (or 602). The UE may implicitly determine based on a UE specific behavior or rule that, because the carrier 600 belongs to the carrier bundle 610, the TB is to be transmitted over the carrier bundle 610.

Referring to FIG. 6B, shown is a block diagram illustrating an example of overlapping carrier bundles configured for a UE. FIG. 6B includes the carriers 600, 602 and 604 and carrier bundles 614 and 616. As illustrated, the carrier bundle 614 includes the carriers 600 and 602, and the carrier bundle 616 includes the carriers 602 and 604.

FIG. 6B differs from the example of FIG. 6A at least in that the carrier bundles 614 and 616 share the carrier 602. Therefore, when TBs are scheduled for transmission over each of the carrier bundles 614 and 616 in parallel, the bandwidth of the carrier 602 is shared during the TB transmissions. If carrier 602 is configured with BWPs, the bandwidth of the active BWP is shared for the TB transmissions.

Referring to FIG. 6C, shown is a block diagram illustrating an example of carrier bundles of different sizes configured for a UE. In this example the carrier bundles are non-overlapping, but in some embodiments the carrier bundles could be overlapping bundles of different sizes. FIG. 6C includes the carriers 600, 602 and 604 and carrier bundles 618 and 620. As illustrated, the carrier bundle 618 includes the carriers 600 and 602 and the carrier bundle 620 includes the carrier 604.

FIG. 6C differs from the example of FIG. 6A at least in that the carrier bundle 618 includes more carriers than the carrier bundle 620. Carrier bundle 620 includes one carrier, and transmits at most one TB over a given duration (excluding TBs that are scheduled simultaneously over different antenna ports or MIMO layers), which is associated with only one HARQ entity and HARQ process. Although carrier bundle 618 includes two carriers, it also transmits at most one TB over a given duration (excluding TBs that are scheduled simultaneously over different antenna ports or MIMO layers), which is associated with only one HARQ entity and HARQ process.

The numbers and configurations of carriers and carrier bundles illustrated in FIGS. 6A-6C are provided by way of example. Numbers and configurations of carriers and carrier bundles other than those illustrated are also contemplated. For example, some embodiments provide values of N greater or less than 2.

Figure 7A:
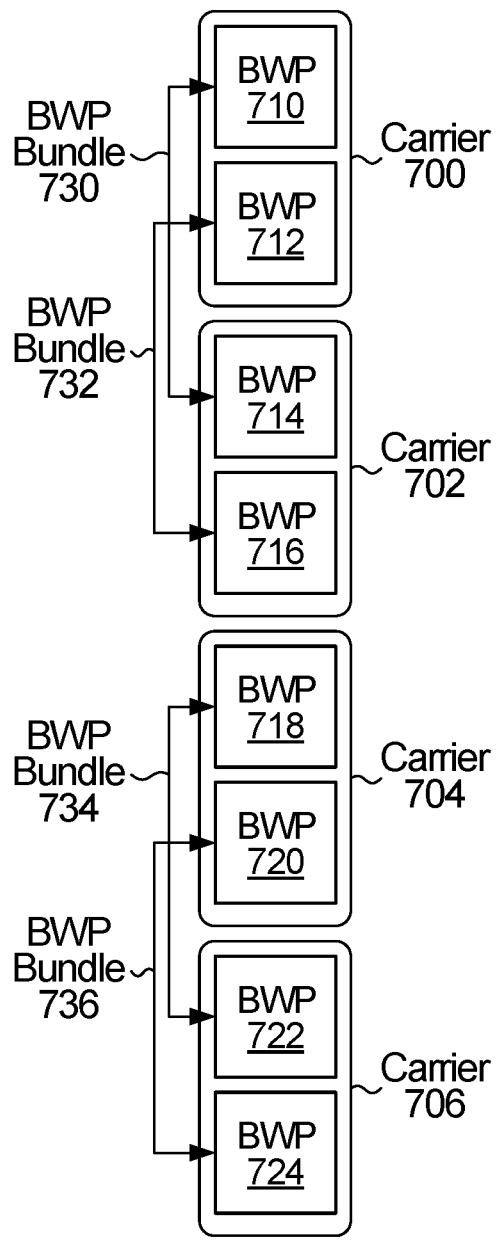
FIG. 7A is a schematic diagram illustrating an example of non-overlapping bandwidth part (BWP) bundles, each bundle including two BWPs.

In other embodiments, the value of N defined above is equivalent to the number of BWP bundles configured for a UE, as illustrated in FIGS. 7A-7C. These embodiments may relate to a UE with more than one active BWP per carrier over a given duration.

Referring to FIG. 7A, shown is a block diagram illustrating an example of non-overlapping BWP bundles configured for a UE. FIG. 7A includes carriers 700, 702, 704 and 706, which are configured for the UE over a given duration. Carrier 700 includes BWPs 710 and 712, carrier 702 includes BWPs 714 and 716, carrier 704 includes BWPs 718 and 720, and carrier 706 includes BWPs 722 and 724. FIG. 7A also illustrates how the BWPs 710, 712, 714, 716, 718, 720, 722 and 724 are bundled as BWP bundles 730, 732, 734 and 736. As illustrated, BWP bundle 730 includes BWPs 710 and 714, BWP bundle 732 includes BWPs 712 and 716, BWP bundle 734 includes BWPs 718 and 722, and BWP bundle 736 includes BWPs 720 and 724. Although it appears that the two BWPs in each carrier occupy a majority of the carrier bandwidth and are adjacent to one another, it should be understood that the BWPs can be any reasonably sized portion of a carrier and if there are multiple active BWPs in a carrier bundle in different respective BWP bundles, they do not need to be adjacent to one another. Although not shown in FIG. 7A, carriers 700 and 702 may be considered to form a carrier bundle, because their physical resources are being shared by BWP bundles 730 and 732. Similar comments apply to carriers 704 and 706.

In FIG. 7A, the value of N is equal to the number of BWP bundles, therefore the value of N is equal to 4. A respective TB may be scheduled for transmission over each of the BWP bundles 730, 732, 734 and 736 in parallel. The transmission of a TB over BWP bundle 730 may be performed anywhere over the bandwidth of the BWPs 710 and 714. HARQ processing by a respective HARQ entity is also associated with each TB transmission. Scheduling the transmission of a TB over a BWP bundle may be performed in a number of different ways. In one example, a TB may be scheduled for transmission over the BWP bundle 730 by explicitly indicating that the BWP bundle 730 is to be used for the transmission. In another example, a TB may be scheduled for transmission over the BWP 710. The UE may implicitly determine based on UE specific behaviors or rules that, because the BWP 710 belongs to the BWP bundle 730, the TB is to be transmitted over the BWP bundle 730.

Referring to FIG. 7B, shown is a block diagram illustrating an example of overlapping BWP bundles configured for a UE. FIG. 7B includes carriers 700 and 702 and 704. FIG. 7B also illustrates how BWPs 710, 712, 714, 716, 718 and 720 are bundled in BWP bundles 740, 742, 744 and 746. As illustrated, BWP bundle 740 includes BWPs 710 and 714, BWP bundle 742 includes BWPs 712 and 716, BWP bundle 744 includes BWPs 714 and 718, and BWP bundle 746 includes BWPs 716 and 720. Although not shown in FIG. 7B, carriers 700 and 702 may be considered to form a carrier bundle, because their physical resources are being shared by BWP bundles 740 and 742. Similar comments apply to carriers 702 and 704.

FIG. 7B differs from the example of FIG. 7A at least in that BWP bundles 740 and 744 share BWP 714, and BWP bundles 742 and 746 share BWP 716. Therefore, when TBs are scheduled for transmission over each of BWPs bundles 740 and 744 in parallel, the bandwidth of BWP 714 is shared during the TB transmissions. Similar comments apply to simultaneous transmission of TBs on BWP bundles 742 and 746.

Referring to FIG. 7C, shown is a block diagram illustrating an example of non-overlapping BWP bundles of different sizes configured for a UE. In this example the BWP bundles are non-overlapping, but in some embodiments the BWP bundles could be overlapping bundles of different sizes. FIG. 7C includes carriers 700, 702 and 704. FIG. 7C also illustrates how BWPs 710, 712, 714, 716, 718 and 720 are bundled as BWP bundles 750, 752, 754 and 756. As illustrated, BWP bundle 750 includes BWPs 710 and 714, BWP bundle 752 includes BWPs 712 and 716, BWP bundle 754 includes BWP 718, and BWP bundle 756 includes BWP 720. Although not shown in FIG. 7C, carriers 700 and 702 may be considered to form a carrier bundle, because their physical resources are being shared by BWP bundles 750 and 752.

FIG. 7C differs from the example of FIG. 7A in that BWP bundles 750 and 752 include more BWPs than BWP bundles 754 and 756. BWP bundle 754 includes one BWP, and supports transmission of at most one TB over a given duration (excluding TBs that are scheduled simultaneously over different antenna ports or MIMO layers), which is associated with only one HARQ entity and HARQ process. Although BWP bundle 750 includes two BWPs, it also transmits at most one TB over a given duration (excluding TBs that are scheduled simultaneously over different antenna ports or MIMO layers), which is associated with only one HARQ entity and HARQ process.

The numbers and configurations of BWPs and BWP bundles illustrated in FIGS. 7A-7C are provided only by way of example. Numbers and configurations of BWP and BWP bundles other than those illustrated are also contemplated. For example, some embodiments provide values of N greater or less than 4.

In the embodiments illustrated in FIGS. 6A-6C and FIGS. 7A-7C, the value of N may be implicitly determined at the UE based on other configured values (e.g., the number of configured carrier bundles or BWP bundles for a UE).

In further embodiments, the value of N is configurable. In these embodiments, higher-layer signaling such as RRC signaling and MAC control signaling may be used to configure the value of N. Accordingly, the number of parallel or simultaneous TB transmissions, the number of HARQ entities, and the number of parallel or simultaneous HARQ processes are explicitly signaled.

Some aspects of the disclosure relate to the configuration of higher-layer parameters for carriers and BWPs. Non-limiting examples of higher-layer parameters include parameters related to control resource set (CORESET), physical downlink control channel (PDCCH) monitoring, frame structure, numerology, and time or frequency domain resource allocation configuration. The configuration of these higher-layer parameters may be performed by a device similar to the air interface manager 200. The configured higher-layer parameters may be signaled from a radio access network device to a UE in order for the UE to successfully transmit and receive transmissions. The signaling may be performed using higher-layer signaling, such as RRC signaling or MAC signaling.

In the cases of carrier bundling and BWP bundling, higher-layer parameters configured for the carriers and BWPs within the bundles may cause unexpected conflicts in the operation of the network if they are not configured appropriately. The embodiments described below provide methods that may mitigate such conflicts.

According to one embodiment, higher-layer parameters are configured on a per carrier basis or per BWP basis. In this embodiment, there is no requirement that the carriers/BWPs within a carrier/BWP bundle are configured with the same higher-layer parameters. The network (for example, a gNB) may be relied upon to ensure that there is no conflict in the operation of the carrier/BWP bundle due to higher-layer parameters that may be configured differently.

According to another embodiment, higher-layer parameters are configured on a carrier bundle basis or BWP bundle basis. In these embodiments, each carrier/BWP of a carrier/BWP bundle is configured with at least some higher-layer parameters that are common to the carrier/BWP bundle. There may be physical resource savings associated with this embodiment because less signaling is required compared to configuring higher-layer parameters on a per carrier or per BWP basis.

According to yet another embodiment, a primary carrier or primary BWP is configured in each carrier bundle or BWP bundle. The identity of a primary carrier/BWP of a primary carrier/BWP bundle may be signaled to a UE. Higher-layer parameters are also configured for the primary carrier/BWP. In some embodiments, the UE can then apply the higher-layer parameters configured for the primary carrier/BWP to other carriers/BWPs of the carrier/BWP bundle. This embodiment may be considered to be an implicit configuration of higher-layer parameters.

The embodiments described above may serve to configure the higher-layer parameters of carriers and BWPs in carrier bundles and BWP bundles, respectively. Some of the embodiments may also serve to reduce signaling overhead during higher-layer parameter configuration.

Some embodiments of the disclosure relate to the association of carriers to carrier bundles using higher-layer signaling. The number of carrier bundles, denoted as N1, and the number of carriers in a carrier bundle, denoted as N2, may also be indicated using higher-layer signaling. The value of N1 or N2 may equal 1, 2, 4 or 8, however, other values of N1 and N2 are also contemplated. Each of the carriers and the carrier bundles may also be assigned an index or identification (ID), to uniquely identify the carrier or carrier bundle, respectively.

In one embodiment, a value of N1 and a single value of N2 are indicated to a UE. The UE determines there are N2 carriers in each of the N1 carrier bundles. In other words, each bundle has the same number of carriers, similar to the example illustrated in FIG. 6A. Following the indication of N1 and N2, for each bundle index, the N2 carriers that constitute the bundle are indicated to the UE.

In another embodiment, after indicating a value of N1 to a UE, a respective value of N2 is indicated for each carrier bundle index of the N1 carrier bundles. The N2 carriers that constitute each bundle are also indicated. In other words, after indicating a value of N1, a value of N2 and the constituent carriers are indicated for each of the N1 carrier bundles. Therefore, in this embodiment, carrier bundles may have different bundle sizes (see, for example, FIG. 6C).

In yet another embodiment, a value of N1 is first indicated to a UE, however, there is no value of N2 indicated. Rather, a bitmap for each of the N1 carrier bundles is used to indicate the carriers that constitute the carrier bundle. The size of the bitmap may be equal to the number of carriers configured for the UE. For example, if there are 8 carriers configured for the UE, which are indexed from 1 to 8, the carriers constituting a carrier bundle may be indicated using the following bitmap: [01100011]. In this example, carriers with carrier index 2, 3, 7 and 8 form the carrier bundle.

In a further embodiment, a value of N1 is first indicated to a UE. Next, for each configured carrier, the index of a carrier bundle it belongs to is indicated. In this embodiment, each carrier belongs to at most one carrier bundle (see, for example, the example of FIG. 6A).

In another embodiment, a value of N1 is first indicated to the UE. Next, for each configured carrier, a number of carrier bundles the configured carrier belongs to is indicated. This number is denoted as N3, which may equal 1, 2, 4 or 8, for example. The indices of the N3 carrier bundles that the configured carrier belongs to are then indicated.

In yet another embodiment, a value of N1 is first indicated to the UE. For each configured carrier, a bitmap of length N1 is use to indicate the carrier bundles that the carrier belongs to. For example, in the case that N1 is equal to 4 and carrier bundles are indexed from 1 to 4, the following bitmap may be indicated for a configured carrier: [1001]. In this example, the configured carrier is included in a carrier bundle with index 1 and a carrier bundle with index 4.

Although described in the context of the association of carriers to carrier bundles, the general concepts presented above also apply to the association of BWPs to BWP bundles. The embodiments provided below are related to the association of BWPs to the BWP bundles. Moreover, the embodiments provided below may also relate to the association of BWPs to carrier bundles.

Figure 8A:
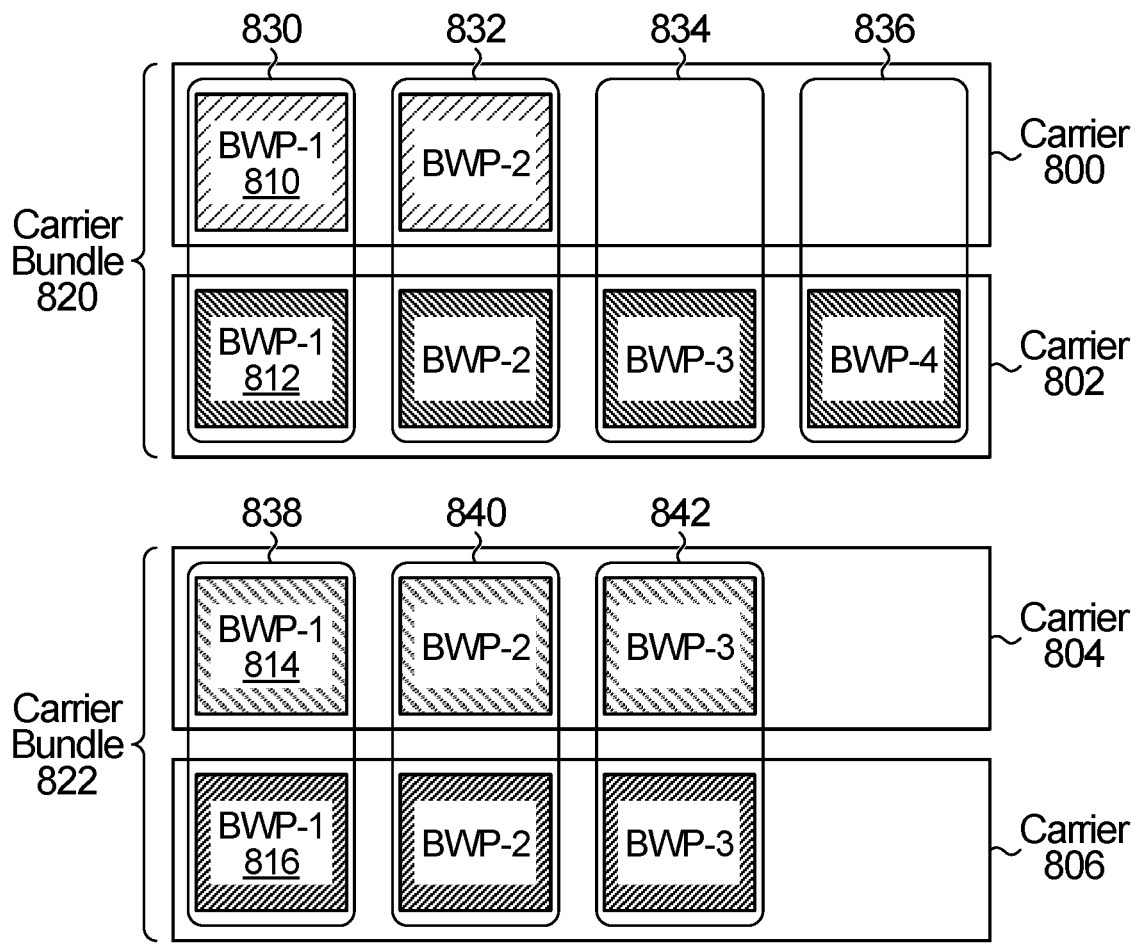
FIG. 8A is a schematic diagram illustrating an example of non-overlapping bundles, each bundle including up to two BWPs, the two BWPs being in different carriers.

BWPs and BWP bundles may be assigned an index or ID to uniquely identify them. In some embodiments, BWPs with a same BWP ID in a carrier bundle are bundled with each other. Referring to FIG. 8A, shown is a block diagram illustrating an example of bundles as sets of BWPs having a same BWP ID. FIG. 8A includes carriers 800, 802, 804 and 806. Carrier 800 includes BWP 810, carrier 802 includes BWP 812, carrier 804 includes BWP 814, and the carrier 806 includes the BWP 816. BWPs 810, 812, 814 and 816 are labelled with a BWP ID of BWP-1. FIG. 8A also illustrates how carriers 800, 802, 804 and 806 are bundled as carrier bundles 820 and 822 and BWPs 810, 812, 814 and 816 are bundled as BWP bundles 830 and 838.

In FIG. 8A, BWPs that belong to a same carrier bundle and have a same BWP ID are bundled together. For example, in carrier bundle 820, carriers 800 and 802 are bundled. In carrier 800, BWP 810 has the BWP ID of BWP-1, and in carrier 802, BWP 812 has the BWP ID of BWP-1. Therefore, the BWPs 810 and 812 are bundled together in the BWP bundle 830 based on their BWP IDs. BWPs 814 and 816 are also bundled together in the BWP 838, because these BWPs belong to carrier bundle 822 and have the BWP ID of BWP-1. It is to be understood that BWP bundles may not have BWPs in every carrier associated with the BWP bundle. With reference to FIG. 8A, BWP bundle 834 only includes a BWP in carrier 802 and not in carrier 800.

Configuration of behaviors or rules may allow the UE to implicitly determine a BWP bundle to be used for transmission of a TB. For example, the UE may be configured with a behavior or rule that defines when a TB is scheduled for transmission on any BWP in a BWP bundle, the UE will transmit the TB over the entire bundle of BWPs that the identified BWP is a part of. In this example, if a TB is scheduled for transmission on BWP 810, the UE will implicitly determine that the TB is to be transmitted over BWP bundle 830. In other examples, an explicit indication using BWP bundle IDs or indexes may be used to indicate to the UE which BWP bundle to be used for transmission of a TB.

Figure 8B:
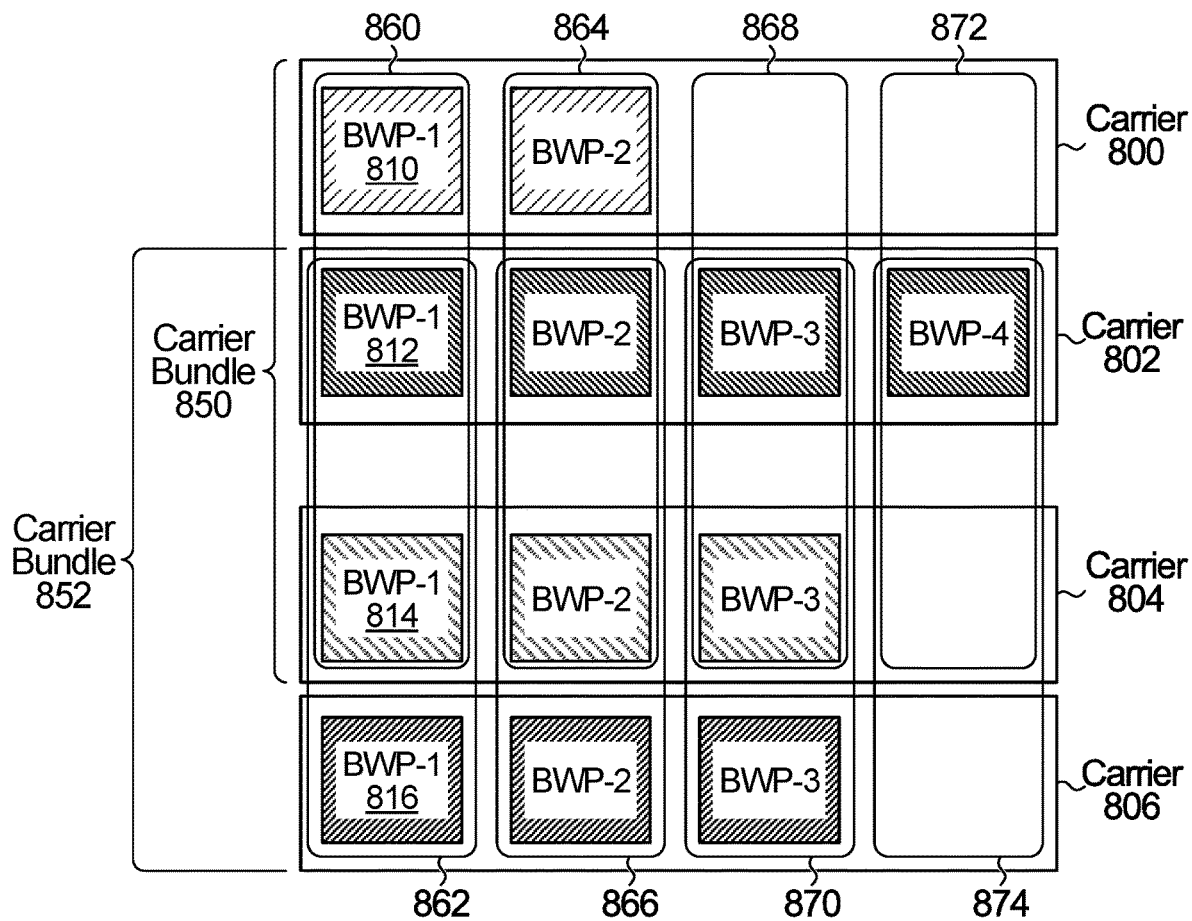
FIG. 8B is a schematic diagram illustrating an example of overlapping BWP bundles, each bundle including up to three BWPs, the three BWPs being in different carriers, and up to two of the BWPs of each bundle being common to at least two bundles.

Referring now to FIG. 8B, shown is a block diagram illustrating an example of overlapping BWP bundles with BWPs having a same BWP ID. FIG. 8B includes the carriers 800, 802, 804 and 806, and the BWPs 810, 812, 814, 816 and 818 described above with reference to FIG. 8A. FIG. 8B also includes carrier bundles 850 and 852 and BWP bundles 860, 862, 864, 866, 868, 870, 872 and 874. Carrier bundle 850 includes carriers 800, 802, and 804, and carrier bundle 852 includes carriers 802, 804 and 806. BWP bundle 860 includes the BWPs 810, 812 and 814. BWP bundle 862 includes the BWPs 812, 814 and 816. It is to be understood that BWP bundles may not have BWPs in every carrier associated with the BWP bundle. With reference to FIG. 8B, BWP bundle 868 includes BWPs in carrier 802 and carrier 804, but not in carrier 800.

In FIG. 8B, similar to FIG. 8A, BWPs that belong to a same carrier bundle and have a same BWP ID are bundled together, which may enable the UE to be configured implicitly based on an identification of at least one BWP in the BWP bundle. FIG. 8B differs from FIG. 8A in that carrier bundles 850 and 852 share carriers 802 and 804. Therefore, there are situations in which BWP bundles are sharing BWPs. This is evident in BWP bundles 860 and 862, which share BWPs 812 and 814.

Figure 9A:
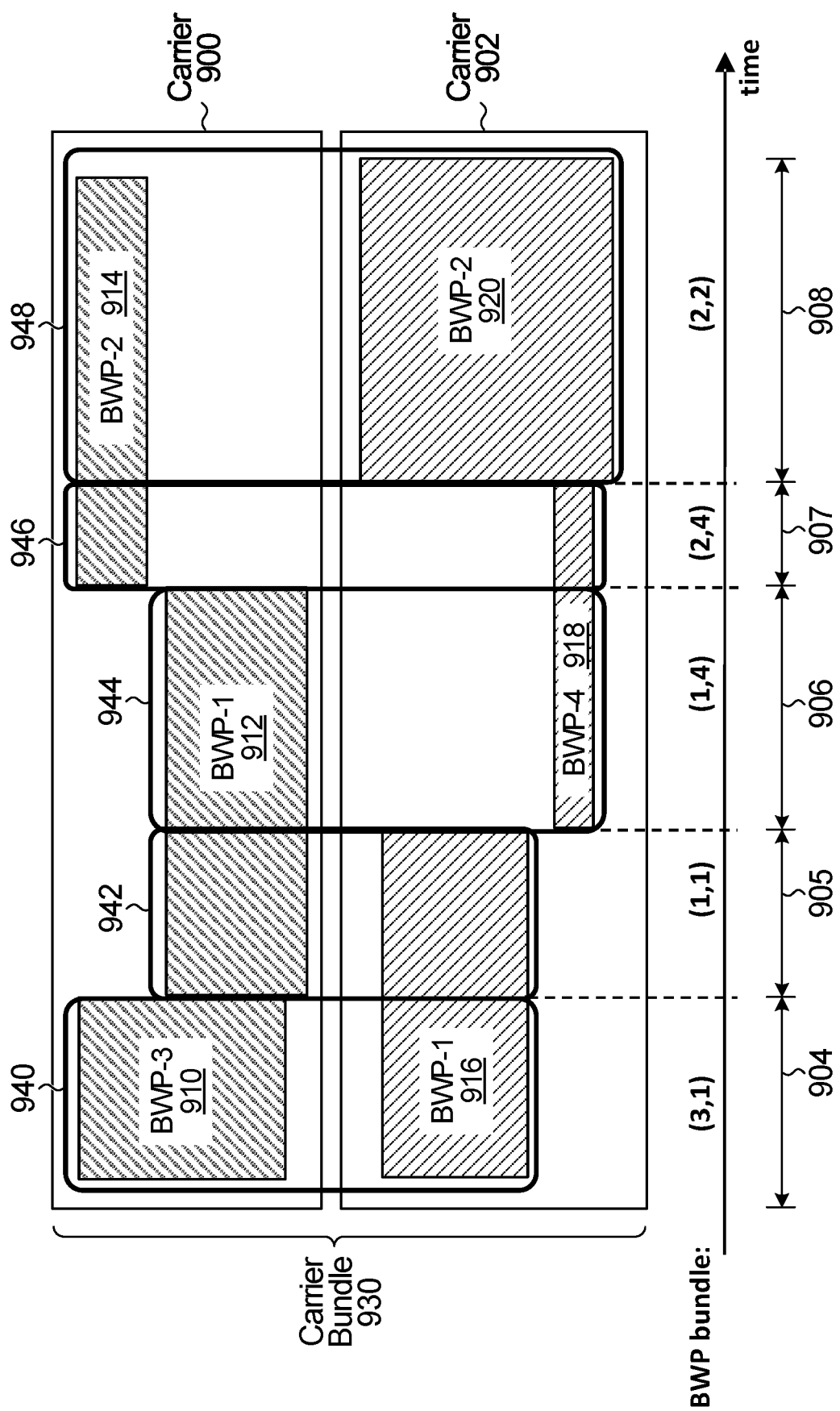
FIG. 9A is a schematic diagram illustrating an example of non-overlapping bundles in respective variable sized time slots, each bundle including two BWPs, the two BWPs being in different carriers.

In other embodiments, the BWPs that are active over a given duration in a carrier bundle are bundled with each other. Referring to FIG. 9A, shown is a block diagram illustrating an example of bundling simultaneously active BWPs in non-overlapping BWP bundles. FIG. 9A includes carriers 900 and 902. Carrier 900 includes the BWPs 910, 912 and 914, and carrier 902 includes the BWPs 916, 918 and 920. Each of carriers 900 and 902 contains only one active BWP over a given duration. The durations may be equal in length, but as can be seen from FIG. 9A, this is not necessary. BWPs 912 and 916 are labelled with a BWP ID of BWP-1; BWPs 914 and 920 are labelled with a BWP ID of BWP-2; BWP 910 is labelled with a BWP ID of BWP-3; and BWP 918 is labelled with a BWP ID of BWP-4. FIG. 9A also illustrates how carriers 900 and 902 are bundled as carrier bundle 930 and how BWPs 910, 912, 914, 916, 918 and 920 are bundled in various configurations as BWP bundles 940, 942, 944, 946 and 948. BWP bundle 940 for duration 904 includes BWPs 910 and 916, BWP bundle 942 for duration 905 includes BWPs 912 and 916, BWP bundle 944 for duration 906 includes BWPs 912 and 918, BWP bundle 946 for duration 907 includes BWPs 914 and 918, and BWP bundle 848 for duration 908 includes the BWPs 914 and 920.

BWP bundles 940, 942, 944, 946 and 948 each contain BWPs that are simultaneously active in carrier bundle 930. When the active BWP of one of carriers 900 and 902 changes, a new BWP bundle is formed. BWP bundles 940, 942, 944, 946 and 948 may be identified by the BWP index of their constituent BWPs. For example, BWP bundle 940 may be identified by (3,1), because BWP bundle 940 includes BWPs with BWP indices of BWP-3 and BWP-1.

Figure 9B:
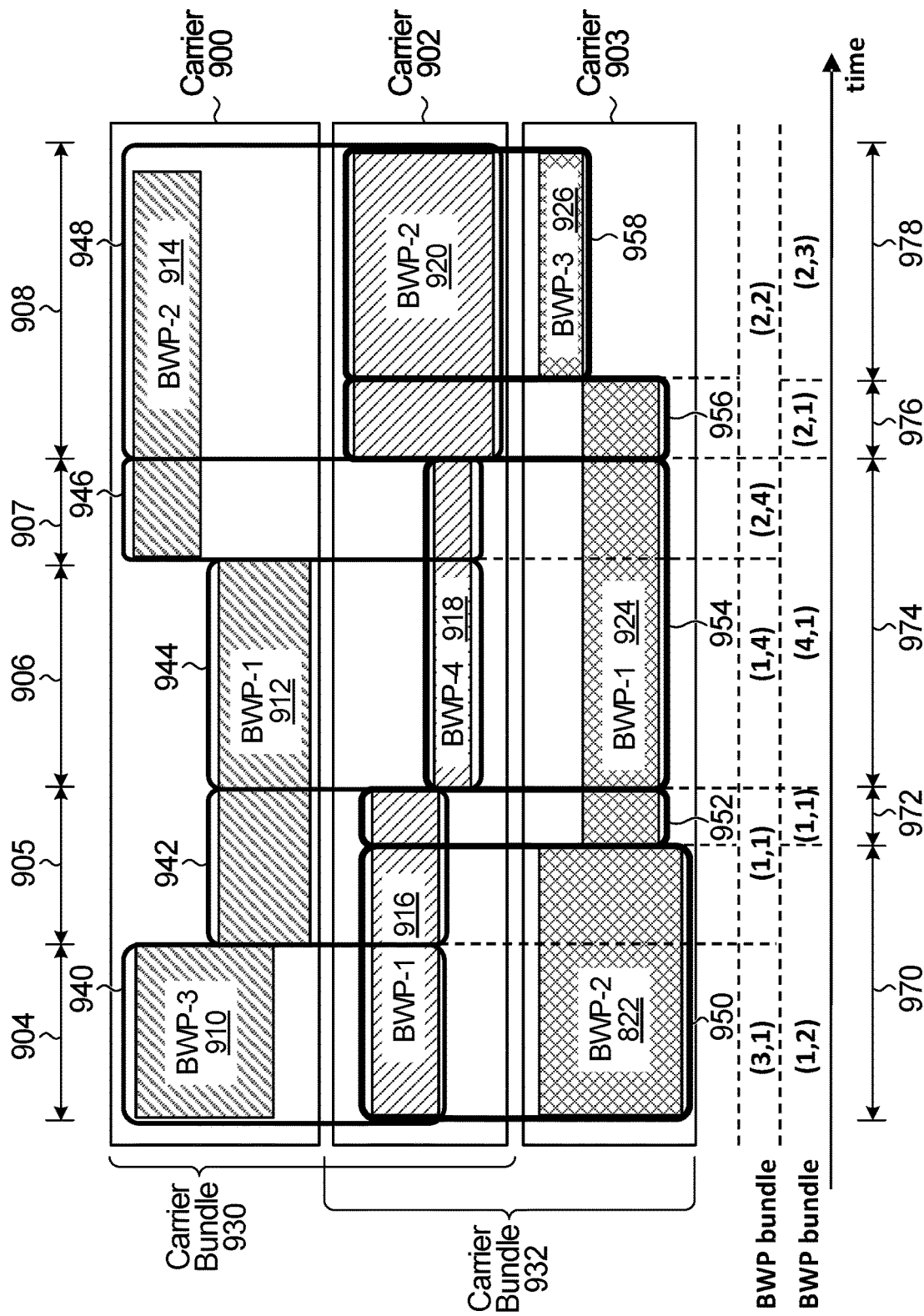
FIG. 9B is a schematic diagram illustrating an example of overlapping bundles in respective variable sized time slots, each bundle including two BWPs, the two BWPs being in different carriers, and one of the BWPs of each bundle being common to at least two bundles.

Referring to FIG. 9B, shown is a block diagram illustrating an example of overlapping BWP bundles formed from bundling simultaneously active BWPs. FIG. 9B includes carriers 900 and 902 and the BWPs 910, 912, 914, 916, 918 and 920 having a same configuration as in FIG. 9A. FIG. 9B also includes carrier 903, which includes BWPs 922, 924 and 926. Carrier 903 contains only one active BWP over a given duration. BWP 922 is labelled with a BWP ID of BWP-2, BWP 924 is labelled with a BWP ID of BWP-1, and BWP 926 is labelled with a BWP ID of BWP-3. FIG. 9B illustrates carrier 900 and carrier 902 bundled in carrier bundle 930. For the durations 904, 905, 906, 907, and 908, the active BWPs in carriers 900 and 902 are bundled in BWP bundles 940, 942, 944, 946 and 948, respectively. FIG. 9B also illustrates carrier 902 and carrier 903 bundled in carrier bundle 932. The active BWPs in carriers 902 and 903 are bundled in BWP bundles 950, 952, 954, 956 and 958 in durations 970, 972, 974, 976 and 978, respectively. BWP bundle 950 includes the BWPs 916 and 922 in duration 970, BWP bundle 952 includes BWPs 916 and 924 in duration 972, BWP bundle 954 includes BWPs 918 and 924 in duration 974, BWP bundle 956 includes BWPs 920 and 924 in duration 976, and the BWP bundle 858 includes the BWPs 920 and 926 in duration 978. The BWP bundles in carrier bundle 930 occur over durations 904, 905, 906, 907 and 908 as described above with reference to FIG. 9A.

In FIG. 9B, similar to FIG. 9A, BWPs that belong to the same carrier bundle and are active over a given duration are bundled together. FIG. 9B differs from FIG. 9A in that the carrier bundles 930 and 932 share the carrier 902. Therefore, there are situations in which BWP bundles are sharing active BWPs. This is evident in the BWP bundles 940 and 950, which share the BWP 916. However, it should be noted that in the example of FIG. 9A the durations of BWPs 940 and 950 are different. It should be understood that the BWP bundle duration may be different for different BWP bundles, this is not necessarily always the case and BWP bundle durations may be the same length and align with one another.

Figure 10A:
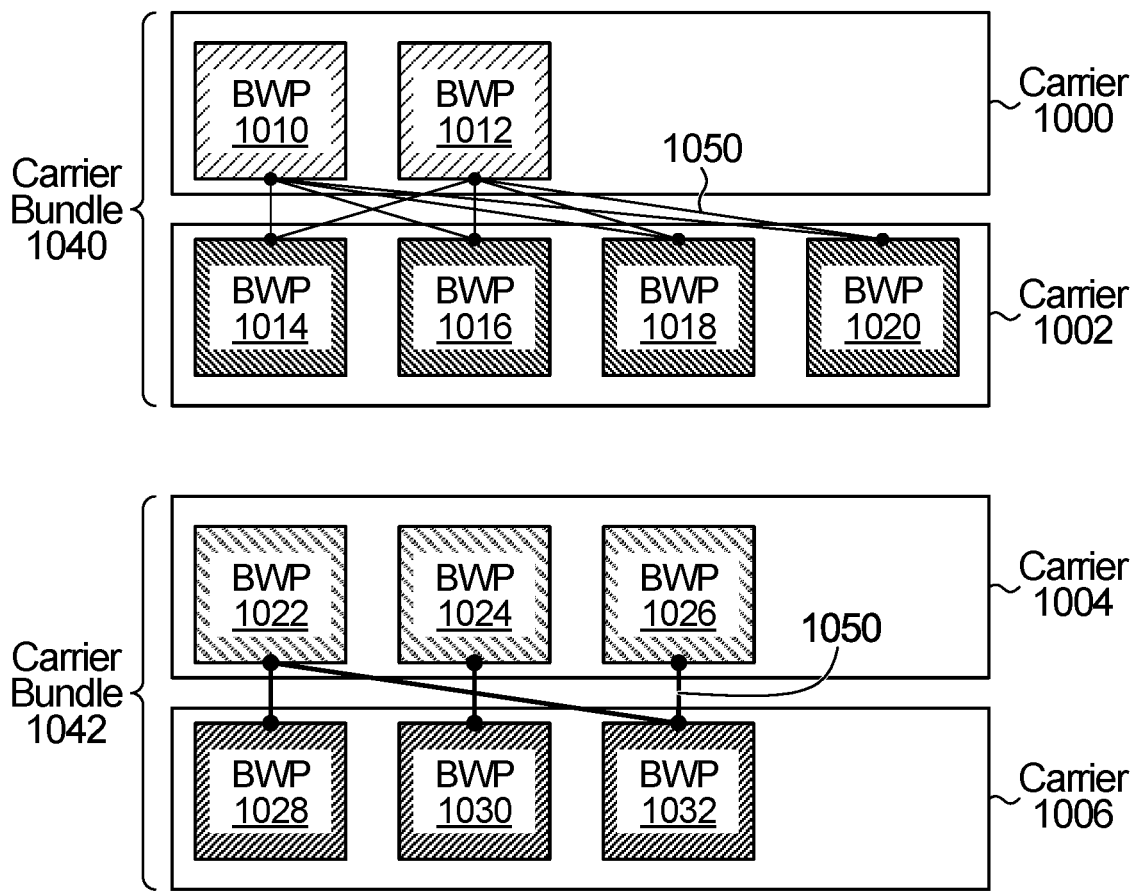
FIG. 10A is a schematic diagram illustrating an example of explicitly signaled non-overlapping BWP bundles.

In further embodiments, the BWPs in carrier bundles are explicitly bundled together. Referring to FIG. 10A, shown is a block diagram illustrating an example of non-overlapping BWP bundles in which the BWP bundles would be explicitly identified to the UE. FIG. 10A includes carriers 1000, 1002, 1004 and 1006 and BWPs 1010, 1012, 1014, 1016, 1018, 1020, 1022, 1024, 1026, 1028, 1030 and 1032. Carrier 1000 includes the BWPs 1010 and 1012; carrier 1002 includes BWPs 1014, 1016, 1018 and 1020; carrier 1004 includes the BWPs 1022, 1024 and 1026; and carrier 1006 includes the BWPs 1028, 1030 and 1032. FIG. 10A also includes carrier bundles 1040 and 1042. Carrier bundle 1040 includes carriers 1000 and 1002 and the carrier bundle 1042 includes the carriers 1004 and 1006. Potential BWP bundles are indicated by connections 1050. For example, BWP 1010 is connected to BWPs 1014, 1016, 1018 and 1020 by the connections 1050, and therefore BWPs 1010, 1014, 1016, 1018 and 1020 are bundled together. BWPs may belong to more than one BWP bundle. However, connections 1050 only exist between BWPs in a same carrier bundle.

The BWPs in the BWP bundles indicated by connections 1050 may be signaled to a UE using higher-layer signaling or DCI.

Figure 10B:
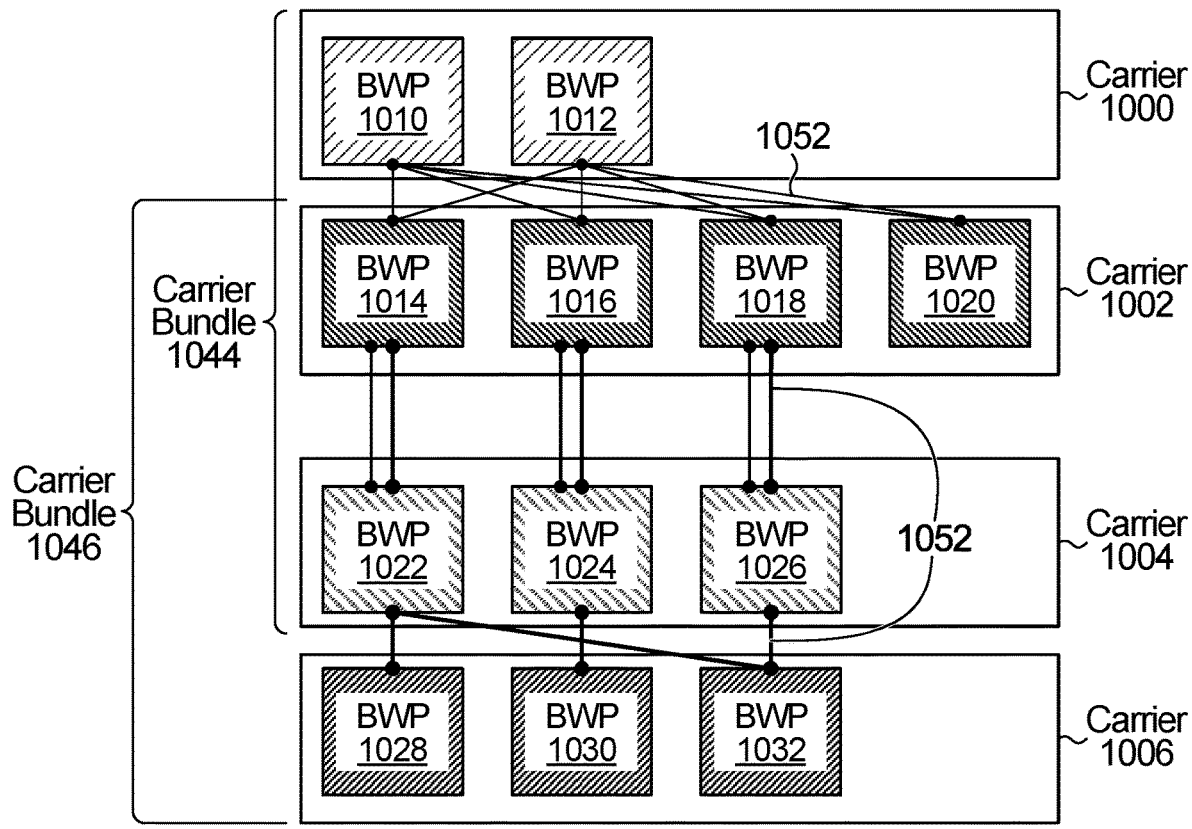
FIG. 10B is a schematic diagram illustrating an example of explicitly signaled overlapping BWP bundles.

Referring to FIG. 10B, shown is a block diagram illustrating an example of overlapping BWP bundles with BWPs explicitly bundled. FIG. 10B includes the carriers 1000, 1002, 1004 and 1006 and the BWPs 1010, 1012, 1014, 1016, 1018, 1020, 1022, 1024, 1026, 1028, 1030 and 1032. FIG. 10B also includes carrier bundles 1044 and 1046. The carrier bundle 1040 includes carriers 1000, 1002 and 1004 and the carrier bundle 1046 includes carriers 1002, 1004 and 1006. BWP bundles are identified by connections 1052. FIG. 9B differs from FIG. 9A in that the carrier bundles 1044 and 1046 share carriers 1002 and 1004.

Explicit bundling, such as that illustrated in FIGS. 10A and 10B, may allow for more control in BWP bundling. However, explicit bundling may require a higher signaling overhead compared to the implicit bundling illustrated in FIGS. 8A, 8B, 9A and 9B.

Figure 11:
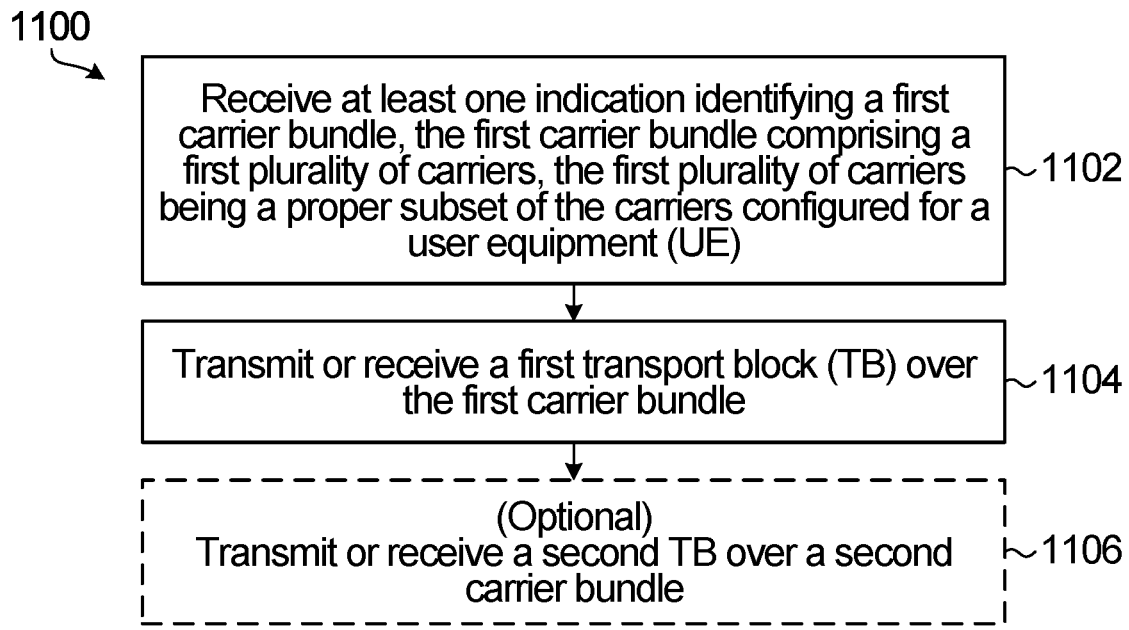
FIG. 11 is a flow chart illustrating a method according to a first aspect of the application.

FIG. 11 is a flow diagram 1100 of operations according to example embodiments described herein. In block 1102, at least one indication identifying a first carrier bundle is received. The first carrier bundle includes a first plurality of carriers in which the first plurality of carriers is a proper subset of the carriers configured for a UE. In block 1104, a first transport block (TB) is transmitted or received over the first carrier bundle. In optional block 1106, when the at least one indication received in block 1102 also identifies a second carrier bundle, a second TB is transmitted or received over the second carrier bundle. The second carrier bundle includes at least one carrier of the carriers configured for the UE. In some embodiments, the example operations 1100 are performed by a UE.

The example operations are illustrative of an example embodiment. Various ways to perform the illustrated operations, as well as examples of other operations that may be performed, are described herein. Further variations may be or become apparent.

For example, in some embodiments, the first TB is associated with a first HARQ entity and the second TB is associated with a second HARQ entity different from the first HARQ entity.

In some embodiments, the first carrier bundle and the second carrier bundle share at least one common carrier.

In other embodiments, a number of carriers in the first carrier bundle is different from a number of carriers in the second carrier bundle.

In further embodiments, a first HARQ process is associated with the first TB; and a second HARQ process, different from the first HARQ process, is associated with the second TB.

In other embodiments, the at least one indication includes a configuration of higher-layer parameters on a per carrier basis for the first carrier bundle, a configuration of higher-layer parameters on a carrier bundle basis, or a configuration of higher-layer parameters of a primary carrier of the first carrier bundle. In some embodiments, the configuration of the higher-layer parameters of the primary carrier is applied to the other carriers of the first carrier bundle. The at least one indication may include an indication of the primary carrier of the first carrier bundle.

In some embodiments, the at least one indication indicates a number of carrier bundles configured for the UE. In other embodiments, the at least one indication identifies, for each carrier bundle, the plurality of carriers that belong to the carrier bundle. In further embodiments, the at least one indication includes, for each of the carriers configured for the UE, an indication identifying at least one carrier bundle that the respective carrier belongs to.

In some embodiments, the at least one indication further identifies a bandwidth part (BWP) bundle as a set of BWPs configured in each carrier of the carrier bundle that have a same BWP ID. In other embodiments, the at least one indication further comprises, when only a single bandwidth part (BWP) is active in each carrier of the first carrier bundle during a given duration, identifying a BWP bundle as a set of the active BWPs in the carriers of the first carrier bundle during the given duration. In further embodiments, the at least one indication further includes identifying a bandwidth part (BWP) bundle based upon an explicit association of BWPs in the BWP bundle.

Figure 12:
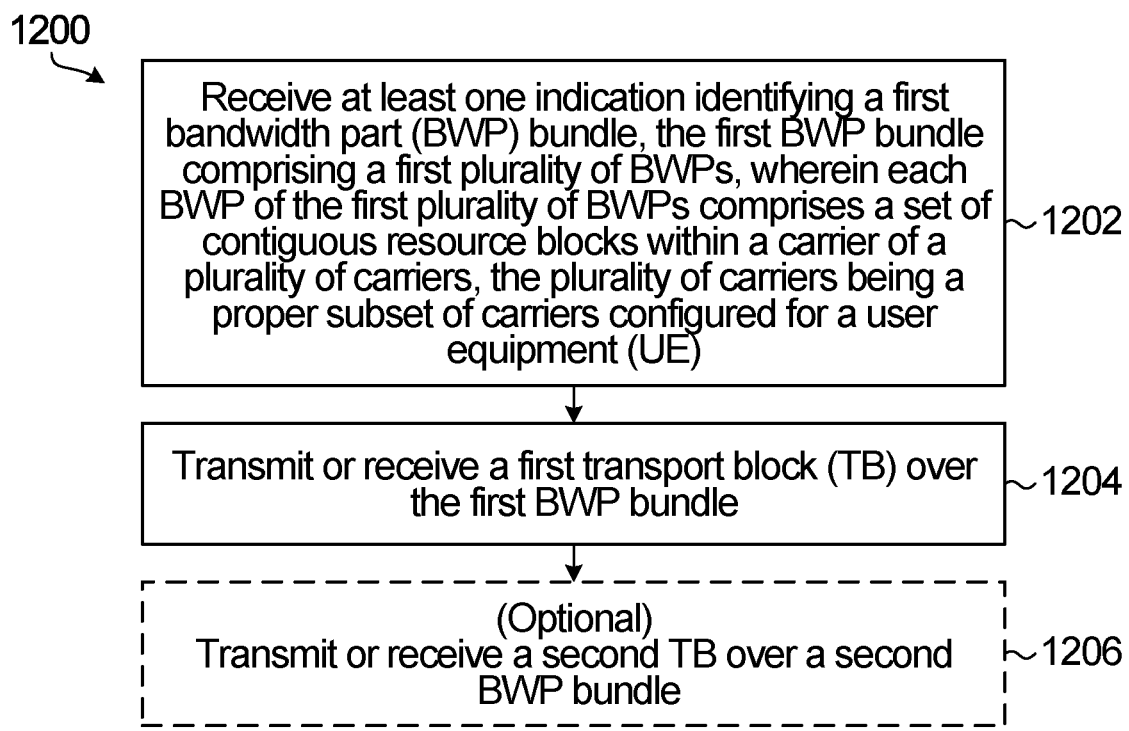
FIG. 12 is another flow chart illustrating a method according to a second aspect of the application.

FIG. 12 is a flow diagram 1200 of operations according to example embodiments described herein. In block 1202, at least one indication identifying a first BWP bundle is received. The first BWP bundle includes a first plurality of BWPs, where each BWP of the first plurality of BWPs includes a set of contiguous resource blocks within a carrier of a plurality of carriers. The plurality of carriers is a proper subset of carriers configured for a UE. In block 1204, a first TB is transmitted or received over the first BWP bundle. In optional block 1206, when the at least one indication also identifies a second BWP bundle, a second TB is transmitted or received over the second BWP bundle. The second BWP bundle includes at least one BWP within the plurality of carriers. In some embodiments, the example operations 1200 are performed by a UE.

The example operations are illustrative of an example embodiment. Various ways to perform the illustrated operations, as well as examples of other operations that may be performed, are described herein. Further variations may be or become apparent.

For example, in some embodiments, the first TB is associated with a first HARQ entity and the second TB is associated with a second HARQ entity different from the first HARQ entity.

In other embodiments, the first BWP bundle and the second BWP bundle share at least one common BWP.

In further embodiments, a number of BWPs in the first BWP bundle is different from a number of BWPs in the second BWP bundle.

In some embodiments, the at least one indication identifies the first BWP bundle as a set of BWPs configured in each carrier of the plurality of carriers that have a same BWP ID. In other embodiments, the at least one indication identifying the first BWP bundle includes, when only a single BWP is active in each carrier of the plurality of carriers during a given duration, identifying the first BWP bundle as a set of the active BWPs in the carriers of the plurality of carriers during the given duration. In further embodiments, the at least one indication includes identifying the first BWP bundle based upon an explicit association of the BWPs in the first BWP bundle.

In some embodiments, a first HARQ process is associated with the first TB; and a second HARQ process, different from the first HARQ process, is associated with the second TB.

In some embodiments, the at least one indication includes a configuration of higher-layer parameters on a per BWP basis for the first BWP bundle. In other embodiments, the at least one indication includes a configuration of higher-layer parameters on a BWP bundle basis. In further embodiments, the at least one indication includes a configuration of higher-layer parameters of a primary BWP of the first BWP bundle and the configuration of the higher-layer parameters of the primary BWP is applied to the other BWPs of the first BWP bundle. The at least one indication may also include an indication of the primary BWP of the first BWP bundle.

Figure 13:
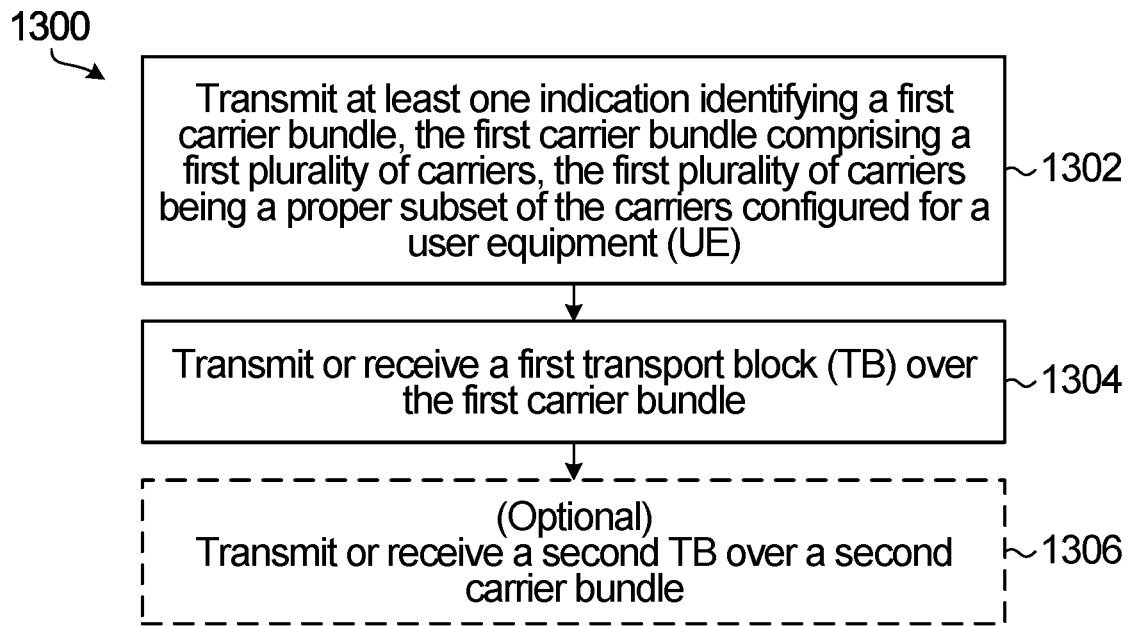
FIG. 13 is yet another flow chart illustrating a method according to a third aspect of the application.

FIG. 13 is a flow diagram 1300 of operations according to example embodiments described herein. In block 1302, at least one indication identifying a first carrier bundle is transmitted. The first carrier bundle includes a first plurality of carriers, in which the first plurality of carriers is a proper subset of the carriers configured for a UE. In block 1304, a first TB is transmitted or received over the first carrier bundle. In optional block 1306, when the at least one indication also identifies a second carrier bundle, a second TB is transmitted or received over the second carrier bundle. The second carrier bundle includes at least one carrier of the carriers configured for the UE. The blocks 1302, 1304 and optional block 1306 generally correspond to the blocks 1102, 1104 and optional block 1106 of FIG. 11. However, the at least one indication is transmitted in block 1302 rather than received. In some embodiments, the example operations 1300 are performed by a base station.

Figure 14:
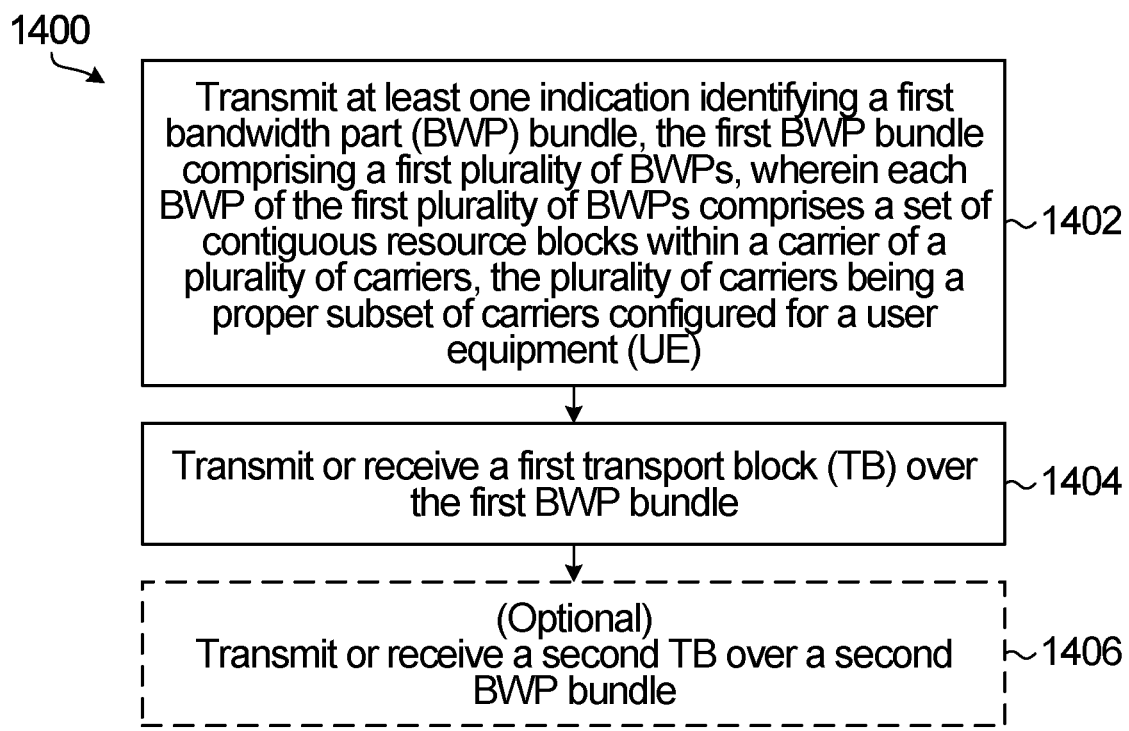
FIG. 14 is yet another flow chart illustrating a method according to a fourth aspect of the application.

FIG. 14 is a flow diagram 1400 of operations according to example embodiments described herein. In block 1402, at least one indication identifying a first BWP bundle is transmitted. The first BWP bundle includes a first plurality of BWPs, where each BWP of the first plurality of BWPs includes a set of contiguous resource blocks within a carrier of a plurality of carriers. The plurality of carriers is a proper subset of carriers configured for a UE. In block 1404, a first TB is transmitted or received over the first BWP bundle. In optional block 1406, when the at least one indication also identifies a second BWP bundle, a second TB is transmitted or received over the second BWP bundle. The second BWP bundle includes at least one BWP within the plurality of carriers. The blocks 1402, 1404 and optional block 1406 generally correspond to the blocks 1202, 1204 and optional block 1206 of FIG. 12. However, the at least one indication is transmitted in block 1402 rather than received. In some embodiments, the example operations 1400 are performed by a base station.

The following is a non-limiting list of examples according to the present disclosure:

Example 1

A method comprising:
receiving at least one indication identifying a first bandwidth part (BWP) bundle, the first BWP bundle comprising a first plurality of BWPs, wherein each BWP of the first plurality of BWPs comprises a set of contiguous resource blocks within a carrier of a plurality of carriers, the plurality of carriers being a proper subset of carriers configured for a user equipment (UE); and
transmitting or receiving a first transport block (TB) over the first BWP bundle.

Example 2

The method of example 1, wherein the at least one indication identifies a second BWP bundle including at least one BWP within the plurality of carriers, the method further comprising:

transmitting or receiving a second TB over the second BWP bundle.

Example 3

The method of example 2, wherein the first TB is associated with a first hybrid automatic repeat request (HARQ) entity and the second TB is associated with a second HARQ entity different from the first HARQ entity.

Example 4

The method of example 2 or example 3, wherein the first BWP bundle and the second BWP bundle share at least one common BWP.

Example 5

The method of any one of example 2 to example 4, wherein a number of BWPs in the first BWP bundle is different from a number of BWPs in the second BWP bundle.

Example 6

The method of any one of example 1 to example 5, wherein the at least one indication identifies the first BWP bundle as a set of BWPs configured in each carrier of the plurality of carriers that have a same BWP ID.

Example 7

The method of any one of example 1 to example 5, wherein the at least one indication identifying the first BWP bundle comprises, when only a single BWP is active in each carrier of the plurality of carriers during a given duration, identifying the first BWP bundle as a set of the active BWPs in the carriers of the plurality of carriers during the given duration.

Example 8

The method of any one of example 1 to example 5, wherein the at least one indication comprises identifying the first BWP bundle based upon an explicit association of the BWPs in the first BWP bundle.

Example 9

The method of any one of example 2 to example 8, wherein:
a first hybrid automatic repeat request (HARQ) process is associated with the first TB; and
a second HARQ process, different from the first HARQ process, is associated with the second TB.

Example 10

The method of any one of example 1 to example 9, wherein the at least one indication comprises a configuration of higher-layer parameters on a per BWP basis for the first BWP bundle.

Example 11

The method of any one of example 1 to example 9, wherein the at least one indication comprises a configuration of higher-layer parameters on a BWP bundle basis.

Example 12

The method of any one of example 1 to example 9, wherein the at least one indication comprises a configuration of higher-layer parameters of a primary BWP of the first BWP bundle; and
wherein the configuration of the higher-layer parameters of the primary BWP is applied to the other BWPs of the first BWP bundle.

Example 13

The method of example 12, wherein the at least one indication comprises an indication of the primary BWP of the first BWP bundle.

Example 14

The method of any one of example 1 to example 13, wherein the method is performed by the UE.

Example 15

A method comprising:
transmitting at least one indication identifying a first carrier bundle, the first carrier bundle comprising a first plurality of carriers, the first plurality of carriers being a proper subset of the carriers configured for a user equipment (UE); and
transmitting or receiving a first transport block (TB) over the first carrier bundle.

Example 16

The method of example 15, wherein the at least one indication identifies a second carrier bundle including at least one carrier of the carriers configured for the UE, the method further comprising:
transmitting or receiving a second TB over the second carrier bundle.

Example 17

The method of example 16, wherein the first TB is associated with a first hybrid automatic repeat request (HARQ) entity and the second TB is associated with a second HARQ entity different from the first HARQ entity.

Example 18

The method of example 16 or example 17, wherein the first carrier bundle and the second carrier bundle share at least one common carrier.

Example 19

The method of any one of example 16 to example 18, wherein a number of carriers in the first carrier bundle is different from a number of carriers in the second carrier bundle.

Example 20

The method of any one of example 16 to example 19, wherein:
a first hybrid automatic repeat request (HARQ) process is associated with the first TB; and
a second HARQ process, different from the first HARQ process, is associated with the second TB.

Example 21

The method of any one of example 15 to example 20, wherein the at least one indication comprises a configuration of higher-layer parameters on a per carrier basis for the first carrier bundle.

Example 22

The method of any one of example 15 to example 20, wherein the at least one indication comprises a configuration of higher-layer parameters on a carrier bundle basis.

Example 23

The method of any one of example 15 to example 20, wherein the at least one indication comprises a configuration of higher-layer parameters of a primary carrier of the first carrier bundle; and
wherein the configuration of the higher-layer parameters of the primary carrier is applied to the other carriers of the first carrier bundle.

Example 24

The method of example 23, wherein the at least one indication comprises an indication of the primary carrier of the first carrier bundle.

Example 25

The method of any one of example 15 to example 24, wherein the at least one indication indicates a number of carrier bundles configured for the UE.

Example 26

The method of any one of example 15 to example 25, wherein the at least one indication identifies, for each carrier bundle, the plurality of carriers that belong to the carrier bundle.

Example 27

The method of any one of example 15 to example 25, wherein the at least one indication comprises, for each of the carriers configured for the UE, an indication identifying at least one carrier bundle that the respective carrier belongs to.

Example 28

The method of any one of example 15 to example 27, wherein the at least one indication further identifies a bandwidth part (BWP) bundle as a set of BWPs configured in each carrier of the carrier bundle that have a same BWP ID.

Example 29

The method of any one of example 15 to example 27, wherein the at least one indication identifying the carrier bundle further comprises, when only a single bandwidth part (BWP) is active in each carrier of the carrier bundle during a given duration, identifying a BWP bundle as a set of the active BWPs in the carriers of the carrier bundle during the given duration.

Example 30

The method of any one of example 15 to example 27, wherein the at least one indication further comprises identifying a bandwidth part (BWP) bundle based upon an explicit association of BWPs in the BWP bundle.

Example 31

The method of any one of example 15 to example 30, wherein the method is performed by a base station.

Example 32

A method comprising:
transmitting at least one indication identifying a first bandwidth part (BWP) bundle, the first BWP bundle comprising a first plurality of BWPs, wherein each BWP of the first plurality of BWPs comprises a set of contiguous resource blocks within a carrier of a plurality of carriers, the plurality of carriers being a proper subset of carriers configured for a user equipment (UE); and
transmitting or receiving a first transport block (TB) over the first BWP bundle.

Example 33

The method of example 32, wherein the at least one indication identifies a second BWP bundle including at least one BWP within the plurality of carriers, the method further comprising:
transmitting or receiving a second TB over the second BWP bundle.

Example 34

The method of example 33, wherein the first TB is associated with a first hybrid automatic repeat request (HARQ) entity and the second TB is associated with a second HARQ entity different from the first HARQ entity.

Example 35

The method of example 33 or example 34, wherein the first BWP bundle and the second BWP bundle share at least one common BWP.

Example 36

The method of any one of example 33 to example 35, wherein a number of BWPs in the first BWP bundle is different from a number of BWPs in the second BWP bundle.

Example 37

The method of any one of example 32 to example 36, wherein the at least one indication identifies the first BWP bundle as a set of BWPs configured in each carrier of the plurality of carriers that have a same BWP ID.

Example 38

The method of any one of example 32 to example 36, wherein the at least one indication identifying the first BWP bundle comprises, when only a single BWP is active in each carrier of the plurality of carriers during a given duration, identifying the first BWP bundle as a set of the active BWPs in the carriers of the plurality of carriers during the given duration.

Example 39

The method of any one of example 32 to example 36, wherein the at least one indication comprises identifying the first BWP bundle based upon an explicit association of the BWPs in the first BWP bundle.

Example 40

The method of any one of example 33 to example 39, wherein:
a first hybrid automatic repeat request (HARQ) process is associated with the first TB; and
a second HARQ process, different from the first HARQ process, is associated with the second TB.

Example 41

The method of any one of example 32 to example 40, wherein the at least one indication comprises a configuration of higher-layer parameters on a per BWP basis for the first BWP bundle.

Example 42

The method of any one of example 32 to example 40, wherein the at least one indication comprises a configuration of higher-layer parameters on a BWP bundle basis.

Example 43

The method of any one of example 32 to any example 40, wherein the at least one indication comprises a configuration of higher-layer parameters of a primary BWP of the first BWP bundle; and
wherein the configuration of the higher-layer parameters of the primary BWP is applied to the other BWPs of the first BWP bundle.

Example 44

The method of example 43, wherein the at least one indication comprises an indication of the primary BWP of the first BWP bundle.

Example 45

The method of any one of example 32 to example 44, wherein the method is performed by a base station.

Example 46

An apparatus comprising:
at least one antenna;
a processor; and
a non-transitory computer readable storage medium storing processor executable instructions for execution by the processor, the processor executable instructions including instructions causing the apparatus to perform a method according to any one of the embodiments of the present disclosure.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method comprising:
receiving at least one indication identifying a first bandwidth part (BWP) bundle, the first BWP bundle comprising a first BWP and a second BWP, each of the first BWP and the second BWP located within a different carrier configured for a user equipment (UE); and
transmitting or receiving a first transport block (TB) over a combination of the first BWP and the second BWP.
2. The method of claim 1, wherein the at least one indication identifies a second BWP bundle including at least a third BWP configured for the UE, the method further comprising:
transmitting or receiving a second TB over the second BWP bundle.
3. The method of claim 2, wherein the first TB is associated with a first hybrid automatic repeat request (HARQ) entity and the second TB is associated with a second HARQ entity different from the first HARQ entity.
4. The method of claim 2, wherein the first BWP bundle and the second BWP bundle share at least one common BWP.
5. The method of claim 2, wherein a number of BWPs in the first BWP bundle is different from a number of BWPs in the second BWP bundle.
6. The method of claim 2, wherein:
a first hybrid automatic repeat request (HARQ) process is associated with the first TB; and
a second HARQ process, different from the first HARQ process, is associated with the second TB.
7. The method of claim 2, wherein the at least one indication identifies, for each BWP bundle, a plurality of BWPs that belong to the BWP bundle.
8. The method of claim 1, wherein the at least one indication comprises a configuration of higher-layer parameters on a per BWP basis for the first BWP bundle.
9. The method of claim 1, wherein the at least one indication comprises a configuration of higher-layer parameters on a BWP bundle basis.
10. The method of claim 1, wherein the at least one indication comprises a configuration of higher-layer parameters of a primary BWP of the first BWP bundle; and
wherein the configuration of the higher-layer parameters of the primary BWP is applied to the other BWPs of the first BWP bundle.
11. The method of claim 10, wherein the at least one indication comprises an indication of the primary BWP of the first BWP bundle.
12. The method of claim 1, wherein the at least one indication indicates a number of BWP bundles configured for the UE.
13. The method of claim 1, wherein the at least one indication comprises, for each of the first BWP and the second BWP configured for the UE, an indication identifying at least one BWP bundle that the respective BWP belongs to.

14. The method of claim 1, wherein the first BWP and the second BWP have a same BWP ID.

15. The method of claim 1, wherein the first BWP and the second BWP are active in each corresponding carrier during a given duration.

16. The method of claim 1, wherein the at least one indication identifies the BWP bundle based upon an explicit association of BWPs in the BWP bundle.

17. A user equipment (UE) comprising:
a transceiver to receive at least one indication identifying a first bandwidth part (BWP) bundle, the first BWP bundle comprising a first BWP and a second BWP, each of the first BWP and the second BWP located within a different carrier configured for the UE,
wherein the transceiver transmits or receives a first transport block (TB) over a combination of the first BWP and the second BWP.

18. The UE of claim 17, wherein the at least one indication identifies a second BWP bundle including at least a third BWP configured for the UE, and wherein the transceiver transmits or receives a second TB over the second BWP bundle.

19. The UE of claim 18, wherein:
the first TB is associated with a first hybrid automatic repeat request (HARQ) entity and a first HARQ process, and
the second TB is associated with a second HARQ entity different from the first HARQ entity and a second HARQ process different from the first HARQ process.

20. The UE of claim 18, wherein the at least one indication identifies, for each BWP bundle, a plurality of BWPs that belong to the BWP bundle.

21. The UE of claim 17, wherein the at least one indication comprises a configuration of higher-layer parameters of a primary BWP of the first BWP bundle;
and wherein the configuration of the higher-layer parameters of the primary BWP is applied to the other BWPs of the first BWP bundle.

22. The UE of claim 21, wherein the at least one indication comprises an indication of the primary BWP of the first BWP bundle.

23. The UE of claim 17, wherein the at least one indication comprises, for each of the first BWP and the second BWP configured for the UE, an indication identifying at least one BWP bundle that the respective BWP belongs to.

24. The UE of claim 17, wherein the first BWP and the second BWP have a same BWP ID.

25. The UE of claim 17, wherein the first BWP and the second BWP are active in each corresponding carrier during a given duration.

26. The UE of claim 17, wherein the at least one indication identifies the BWP bundle based upon an explicit association of BWPs in the BWP bundle.

* * * * *